United States Patent
Douady-Pleven et al.

(10) Patent No.: US 10,657,627 B2
(45) Date of Patent: May 19, 2020

(54) TEMPORAL SMOOTHING IN IMAGE CAPTURE SYSTEMS

(71) Applicant: GoPro, Inc., San Mateo, CA (US)

(72) Inventors: Bruno César Douady-Pleven, Bures-sur-Yvette (FR); Vincent Vacquerie, Paris (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/877,624

(22) Filed: Jan. 23, 2018

(65) Prior Publication Data
US 2019/0228505 A1 Jul. 25, 2019

(51) Int. Cl.
*G06T 5/00* (2006.01)
*G06T 5/20* (2006.01)
*H04N 9/73* (2006.01)
*H04N 5/232* (2006.01)
*B64C 39/02* (2006.01)
(Continued)

(52) U.S. Cl.
CPC ............ *G06T 5/002* (2013.01); *B64C 39/024* (2013.01); *B64D 47/08* (2013.01); *G06T 5/20* (2013.01); *H04N 5/2351* (2013.01); *H04N 5/2355* (2013.01); *H04N 5/23229* (2013.01); *H04N 5/23293* (2013.01); *H04N 9/735* (2013.01); *B64C 2201/027* (2013.01); *B64C 2201/042* (2013.01); *B64C 2201/108* (2013.01); *B64C 2201/127* (2013.01); *H04N 5/23254* (2013.01)

(58) Field of Classification Search
CPC .......... G06T 5/002; G06T 5/20; H04N 9/735; H04N 5/23293; B64D 47/08; B64C 39/024; B64C 2201/042; B64C 2201/108; B64C 2201/127; B64C 2201/107

USPC ......................................................... 348/144
See application file for complete search history.

(56) References Cited

U.S. PATENT DOCUMENTS 5,793,886 A     8/1998    Cok
2005/0018920 A1   1/2005    Ramamurthy
2005/0036704 A1   2/2005    Dumitras
(Continued)

FOREIGN PATENT DOCUMENTS

EP           2922288 A1    9/2015
WO      2015017314 A1    2/2015

OTHER PUBLICATIONS

International Search Report and Written Opinion for Application No. PCT/US2019/014470, dated May 28, 2019, 17 pages.

*Primary Examiner* — Allen C Wong
(74) *Attorney, Agent, or Firm* — Young Basile Hanlon & MacFarlane, P.C.

(57) ABSTRACT

Systems and methods are disclosed for image capture. For example, methods may include accessing a sequence of images from an image sensor; determining a sequence of parameters for respective images in the sequence of images based on the respective images; storing the sequence of images in a buffer; determining a temporally smoothed parameter for a current image in the sequence of images based on the sequence of parameters, wherein the sequence of parameters includes parameters for images in the sequence of images that were captured after the current image; applying image processing to the current image based on the temporally smoothed parameter to obtain a processed image; and storing, displaying, or transmitting an output image based on the processed image.

21 Claims, 16 Drawing Sheets

(51) Int. Cl.
*B64D 47/08* (2006.01)
*H04N 5/235* (2006.01)

(56) References Cited

U.S. PATENT DOCUMENTS

| | | | | |
|---|---|---|---|---|
| 2013/0345973 | A1* | 12/2013 | Covello | H04N 5/23248 |
| | | | | 701/509 |
| 2015/0163414 | A1* | 6/2015 | Nikkanen | H04N 5/353 |
| | | | | 348/229.1 |
| 2016/0366386 | A1* | 12/2016 | Douady-Pleven | G06T 3/4015 |
| 2017/0006340 | A1* | 1/2017 | Enke | H04N 21/44028 |
| 2017/0178302 | A1* | 6/2017 | Finlayson | G06T 5/009 |

* cited by examiner

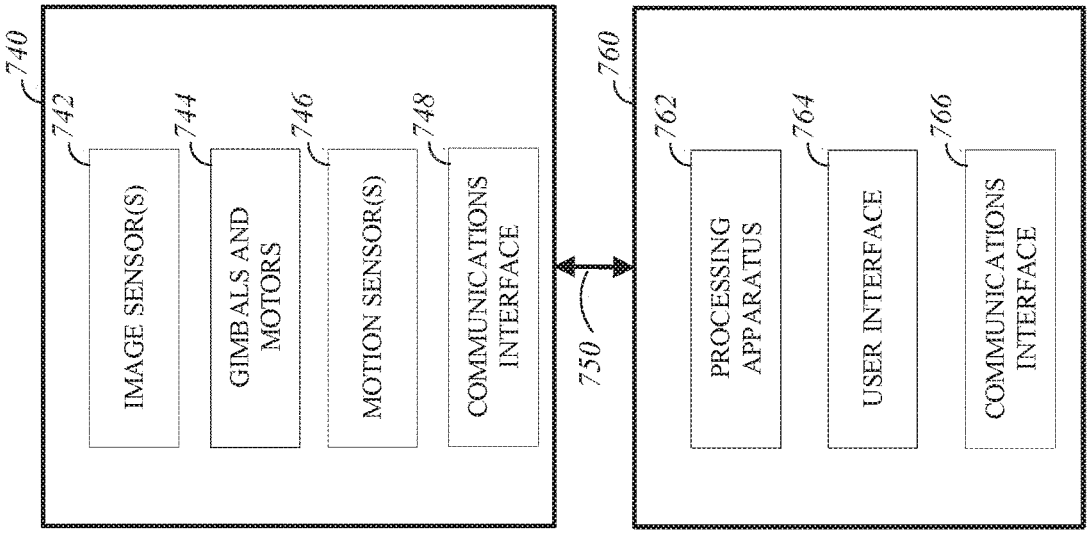
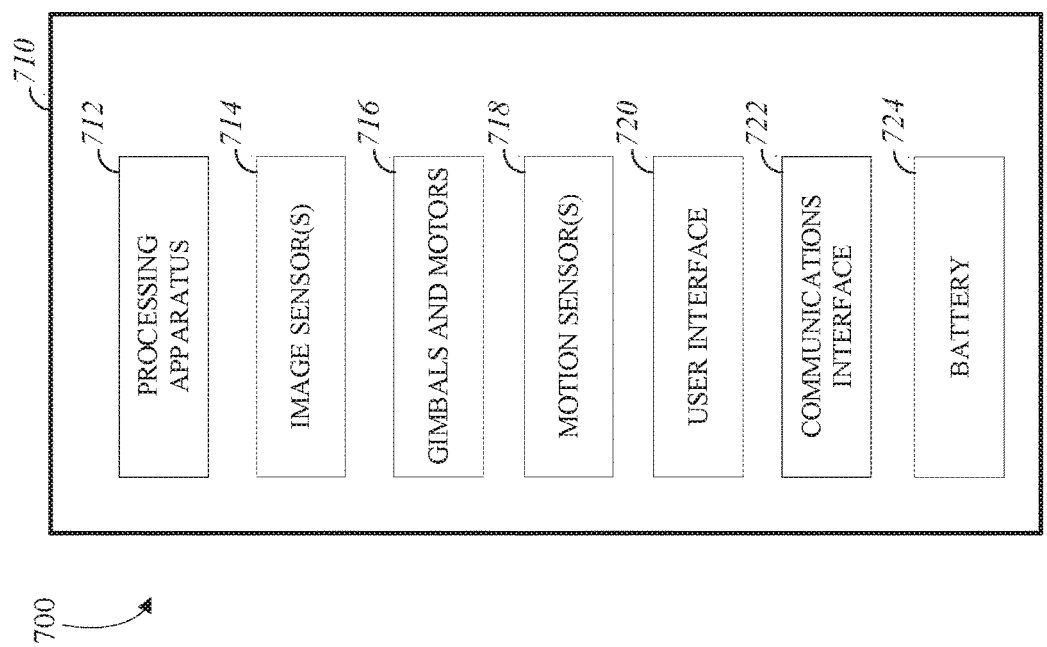
FIG. 7A
FIG. 7B

TEMPORAL SMOOTHING IN IMAGE CAPTURE SYSTEMS

TECHNICAL FIELD

This disclosure relates to temporal smoothing in image capture systems.

BACKGROUND

Image capture devices, such as cameras, may capture content as images or video. Drones have been used to carry cameras and to enable capture of images from the air. Drones with attached cameras are typically controlled by dedicated controlled via a wireless communications link. Mechanical stabilization systems (e.g., gimbals and motors) have been used with drone based cameras to reduce distortion of captured images that can be caused by vibrations and other motions of a drone during capture.

SUMMARY

Disclosed herein are implementations of temporal smoothing in image capture systems.

In a first aspect, the subject matter described in this specification can be embodied in systems that include an image sensor configured to capture a sequence of images, and a processing apparatus configured to: access the sequence of images from the image sensor; determine a sequence of parameters for respective images in the sequence of images based on the respective images; store the sequence of images in a buffer; determine a temporally smoothed parameter for a current image in the sequence of images based on the sequence of parameters, wherein the sequence of parameters includes parameters for images in the sequence of images that were captured after the current image; and apply image processing to the current image based on the temporally smoothed parameter to obtain a processed image.

In a second aspect, the subject matter described in this specification can be embodied in methods that include accessing a sequence of images from an image sensor; determining a sequence of parameters for respective images in the sequence of images based on the respective images; storing the sequence of images in a buffer; determining a temporally smoothed parameter for a current image in the sequence of images based on the sequence of parameters, wherein the sequence of parameters includes parameters for images in the sequence of images that were captured after the current image; applying image processing to the current image based on the temporally smoothed parameter to obtain a processed image; and storing, displaying, or transmitting an output image based on the processed image.

In a third aspect, the subject matter described in this specification can be embodied in systems that include an image sensor configured to capture a sequence of images; a buffer configured to store the sequence of images; and an image signal processor configured to determine a sequence of parameters for respective images in the sequence of images based on the respective images, apply a non-causal filter to the sequence of parameters to obtain a temporally smoothed parameter for a current image in the sequence of images, and apply image processing to the current image based on the temporally smoothed parameter to obtain a processed image.

These and other aspects of the present disclosure are disclosed in the following detailed description, the appended claims, and the accompanying figures.

BRIEF DESCRIPTION OF THE DRAWINGS

The disclosure is best understood from the following detailed description when read in conjunction with the accompanying drawings.

FIG. 7A is a block diagram of an example of a system configured for image capture.

FIG. 7B is a block diagram of an example of a system configured for image capture.

DETAILED DESCRIPTION

Figure 1A:
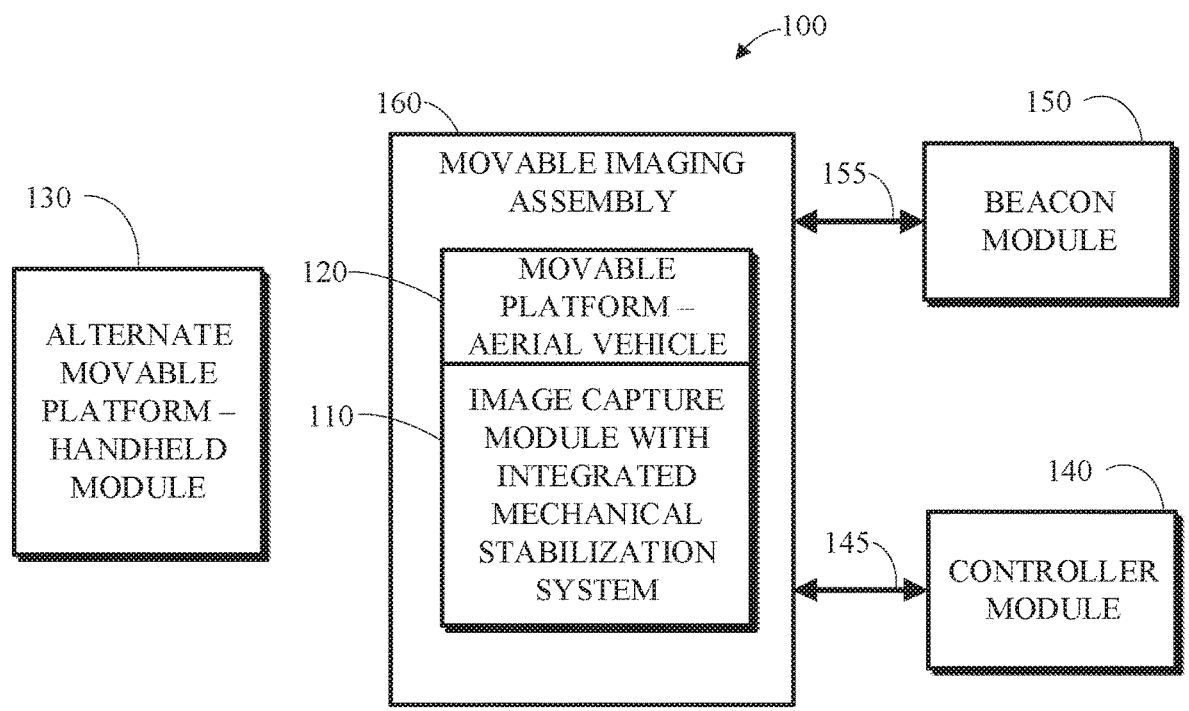
FIG. 1A is a block diagram of a movable imaging system with modular components in a first usage scenario.

This document includes disclosure of systems and techniques for temporal smoothing in image capture systems. Camera controls (e.g., automatic exposure correction, automatic white balance, noise reduction processing, global tone mapping, and/or electronic image stabilization) use parameters (e.g., sets of one or more gains or scale factors) that are determined based on image analysis. The values of these parameters may be temporally smoothed between frames in video mode to avoid sudden changes in an image processing parameter that may degrade perceived image quality. If the smoothing process only has access to the past and not the future, the resulting values may be late, due to algorithmic delay of the filtering used for temporal smoothing.

The benefits of temporally smoothing one or more of these camera control parameters may justify to insert a delay buffer (e.g., storing the most recently captured 15-30 frames) to have access to the future. For example, the buffer may provide access to 0.5 to 1 second of samples associated images in a sequence of images. For example, the delay buffer may be inserted before an image signal processor, in the raw domain, which is not more expensive, to leverage the delay buffer to give access to the same future data to the camera controls. By doing this, automatic exposure correction, automatic white balance, global tone mapping, electronic image stabilization, and/or other modules may be configured to anticipate modifications of the scene by the buffer delay (0.5 to 1 s), which may enable a more balanced temporal smoothing process. For example, use of a delay buffer may be justified by resulting improvements electronic image stabilization performance alone. Once this delay is implemented for electronic image stabilization, the delay buffer may be further leveraged to improve other aspects of camera control. There may be little or no additional costs associated with sharing the delay buffer between electronic image stabilization and other camera control. For example, a delay buffer implemented in a raw domain before processing in an image signal processor may use a similar amount of memory (e.g., about 12 bits/pixel) as a delay buffer implemented in a YUV domain between pixel correction operations in an image signal processor and electronic image stabilization processing. In some implementations, the delay buffer may be inserted after an image signal processor (e.g., in a YUV domain).

The proposed image capture systems and methods may offer advantages over conventional image capture systems. For example, the quality of captured images may be improved (e.g., by reducing motion artifacts) across a variety of usage scenarios. For example, the image quality may be increased in some cases by temporally smoothing parameters for multiple different camera controls.

Implementations are described in detail with reference to the drawings, which are provided as examples to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

FIG. 1A is a block diagram of a movable imaging system 100 with modular components in a first usage scenario. The movable imaging system 100 includes an image capture module 110 with an integrated mechanical stabilization system, an aerial vehicle 120, a handheld module 130, a controller module 140, and a beacon module 150. The image capture module 110 includes a connector that enables the aerial vehicle 120 and the handheld module 130 to be removably attached to the image capture module 110 as alternative movable platforms for image capture in different usage scenarios. In this first usage scenario of FIG. 1A, the aerial vehicle 120 is attached to the image capture module 110 to form a movable imaging assembly 160 that may be used to capture images (e.g., still images or video) while the movable imaging assembly 160 moves in response to signals from the controller module 140 and/or the beacon module 150. In this first usage scenario of FIG. 1A, the handheld module 130 is disconnected from the image capture module 110.

The image capture module 110 includes an image sensor configured to capture images, a connector, and an integrated mechanical stabilization system configured to control an orientation of the image sensor relative to the connector. For example, the image capture module 110 may be the image capture module 200 of FIGS. 2A and 2B. The mechanical stabilization system is integrated in the sense that it is a part of the image capture module 110 that cannot be easily removed without the use of tools or damaging the image capture module 110. For example, the mechanical stabilization system may include gimbals (e.g., three gimbals) and motors that are configured to control an orientation of the image sensor relative to the connector. The mechanical stabilization system may enable capture of high quality images with low blur and reduced shaking or other motion between images in a sequence of images (e.g., frames of video). In some implementations, the mechanical stabilization system enables or improves subject tracking functions, in which a position and/or orientation of the image sensor is actively controlled to follow an object (e.g., a person) appearing a field of view of the image sensor. Having the mechanical stabilization system integrated avoids the use of a potentially unreliable connection between the mechanical stabilization system and the image sensor and can reduce the size and weight of the materials used to attached the mechanical stabilization system to the image sensor. Size and weight are generally important considerations in electronics, but they may be particularly significant in applications, like the first usage scenario of FIG. 1A, where the image capture module 110 including the image sensor and the mechanical stabilization system will be carried by the aerial vehicle 120. Reducing weight of the movable imaging assembly 160 may serve to decrease power consumption to increase battery time. Reducing weight of the movable imaging assembly 160 may also enable compliance with safety regulations applicable to the operation of the aerial vehicle 120 that limit weight of aerial vehicles.

The connector may be male or female. For example, the connector of the image capture module 110 may be keyed to a slot of the aerial vehicle 120 and keyed to a slot of the handheld module 130. The connector may be keyed by virtue of the shape of an outer surface of the connector, which is fitted to the corresponding shape of the slot in the aerial vehicle 120 and the corresponding shape in the slot of the handheld module 130. The keyed shape of the connector may include some asymmetry, which may facilitate easy connection of the aerial vehicle 120 and the handheld module 130 to the image capture module 110 by preventing a user from accidentally inserting the connector in an improper orientation. In some implementations, the connector includes one or more fastening mechanisms (e.g., latches) for securing a connection. The connector may include an electrical connector (e.g., a universal serial bus (USB) type C connector) nested inside of the keyed outer portion of the connector. The electrical connector may include multiple conductors that can be used to provide power from the aerial vehicle 120 to the image capture module 110 and transfer communication signals (e.g., USB 2.0, USB 3.0, I2C, SPI, and/or MIPI (Mobile Industry Processor Interface) signals) between the aerial vehicle 120 and the image capture module 110 when they are connected. For example, conductors of the connection may be used to transfer power, high-speed bulk data transfers, real-time embedded control signaling, and/or raw video signals at a capture frame rate. For example, the connector may include pairs of conductors respectively used to transfer power to the image capture module 110, bulk transfer data from the image capture module 110, transfer control signals to the image capture module 110, and transfer real-time video data from the image capture module 110.

The image sensor of the image capture module 110 is configured to capture images (e.g., still images or frames of video). The image sensor may be configured to detect light of a certain spectrum (e.g., the visible spectrum or the infrared spectrum) and convey information constituting an image as electrical signals (e.g., analog or digital signals). For example, the image sensor may include charge-coupled devices (CCD) or active pixel sensors in complementary metal-oxide-semiconductor (CMOS). The image sensor may include an analog-to-digital converter and output digital image data. The image sensor may detect light incident through a lens (e.g., a rectilinear lens or a fisheye lens). In some implementations, the image capture module 110 includes multiple image sensors that have respective fields of view that overlap and images captured by these image sensors may be stitched together to generate composite images (e.g., panoramic images).

The movable imaging system 100 includes an aerial vehicle 120 (e.g., a drone) configured to be removably attached to the image capture module 110 by the connector and to fly while carrying the image capture module 110. The aerial vehicle 120 may be removably attached in the sense that a user can quickly connect and disconnect the aerial vehicle 120 from the image capture module 110 without using a tool (e.g., by engaging or disengaging one or more latches, rotary-type mechanisms, or click-type mechanisms using fingers). The aerial vehicle 120 may include a slot that fitted to the connector of the image capture module 110, in which the connector may be inserted. For example, the aerial vehicle 120 may include an electrical connector (e.g., a USB type C connector) nested in the slot that includes multiple conductors configured to transfer images and other data and control signals between the aerial vehicle 120 and the image capture module 110 when they are connected to form the movable imaging assembly 160. For example, the aerial vehicle 120 may be a quadcopter. In the first usage scenario of FIG. 1A, the aerial vehicle 120 is connected to the image capture module 110. For example, the aerial vehicle 120 may be the aerial vehicle 500 of FIG. 5.

The movable imaging system 100 includes a beacon module 150 configured to wirelessly transmit position data to the aerial vehicle 120 to enable the aerial vehicle 120 to follow the beacon module 150. The position data may be transmitted via a wireless link 155. For example, the beacon module 150 may include a global positioning system (GPS) receiver and the position data may include GPS coordinates of the beacon module 150. In some implementations, the beacon module 150 includes an inertial measurement unit (e.g., including accelerometers, gyroscopes, and/or magnetometers) and the position data includes changes in the position and/or orientation of the beacon module 150 that are sensed by the inertial measurement unit. For example, the wireless link 155 may utilize a wireless interface standard, such as WiFi, Bluetooth (BT), cellular data link, ZigBee, or ANT+ link. In some implementations, the aerial vehicle 120 is configured to follow a user based on position data from the beacon module 150 and based on computer vision tracking of the user in images from the image capture module. For example, quadratic estimation techniques (e.g., a Kalman filter) may be used to fuse position data from the beacon module 150 with computer vision features to estimate the position of a user holding or wearing the beacon module 150, and the position and/or orientation of the aerial vehicle 120 and the image sensor of the attached image capture module 110 may be controlled based on the estimate of the position of the user. For example, this control of the image sensor field of view may be actuated using the control surfaces (e.g., propellers) of the aerial vehicle 120 and/or the mechanical stabilization system (e.g., gimbals) of the image capture module 110. In some implementations, the beacon module 150 includes a user interface (e.g., including buttons and a display) that allows a user holding the beacon module 150 to issue commands to the movable imaging assembly 160 via the wireless link 155. For example, a user may issue commands to cause the movable imaging assembly 160 to follow the user, to pause following the user and hover in place, or to take-off or land. For example, the beacon module 150 may be the beacon module 650 of FIG. 6B.

The movable imaging system 100 includes a controller module 140 configured to wirelessly communicate with the aerial vehicle 120 to control motion of the aerial vehicle 120 and capture of images using the image sensor while the image capture module 110 is attached to the aerial vehicle 120. The controller module 140 includes a user interface (e.g., joysticks, buttons, and/or a touch-screen display) that allows a user to enter commands to control motion of the movable imaging assembly 160 and the capture of images. Information (e.g., control signals and/or image data) may be transferred between the movable imaging assembly 160 and the controller module via the wireless link 145. For example, the wireless link 145 may utilize a wireless interface standard, such as WiFi, Bluetooth (BT), cellular data link, ZigBee, or ANT+ link. For example, images (e.g., still images or video at full resolution or at reduced resolution) captured by the movable imaging assembly 160 may be received by the controller module 140 and displayed on a touch-screen display to the user. In some implementations, the aerial vehicle 120 is configured to communicate wirelessly with both the beacon module 150 and the controller module 140. Communicating with both the beacon module 150 and the controller module 140 may allow a first user to actively monitor and/or control image capture of the images by the movable imaging assembly 160 from the controller module 140 while the movable imaging assembly 160 follows a second user or other object that is bearing the beacon module 150 passively while moving. This may enhance hands-free following of a subject and enable following objects (e.g., a dog or a car) that are unable to issue commands to the movable imaging assembly 160 or make the experience of being followed more natural and less mentally taxing for the second user, so the second user can focus their attention on other activities (e.g., running, celebrating, soccer, skateboarding, motocross, surfing, snowboarding). The first user can focus on optimizing other aspects of image capture (e.g., choosing perspective on the subject, zooming, or timing snaps of still images) while the autonomous functions of the aerial vehicle 120 handle the following and navigation tasks. For example, the controller module 140 may be the controller module 600 of FIG. 6A.

Figure 1B:
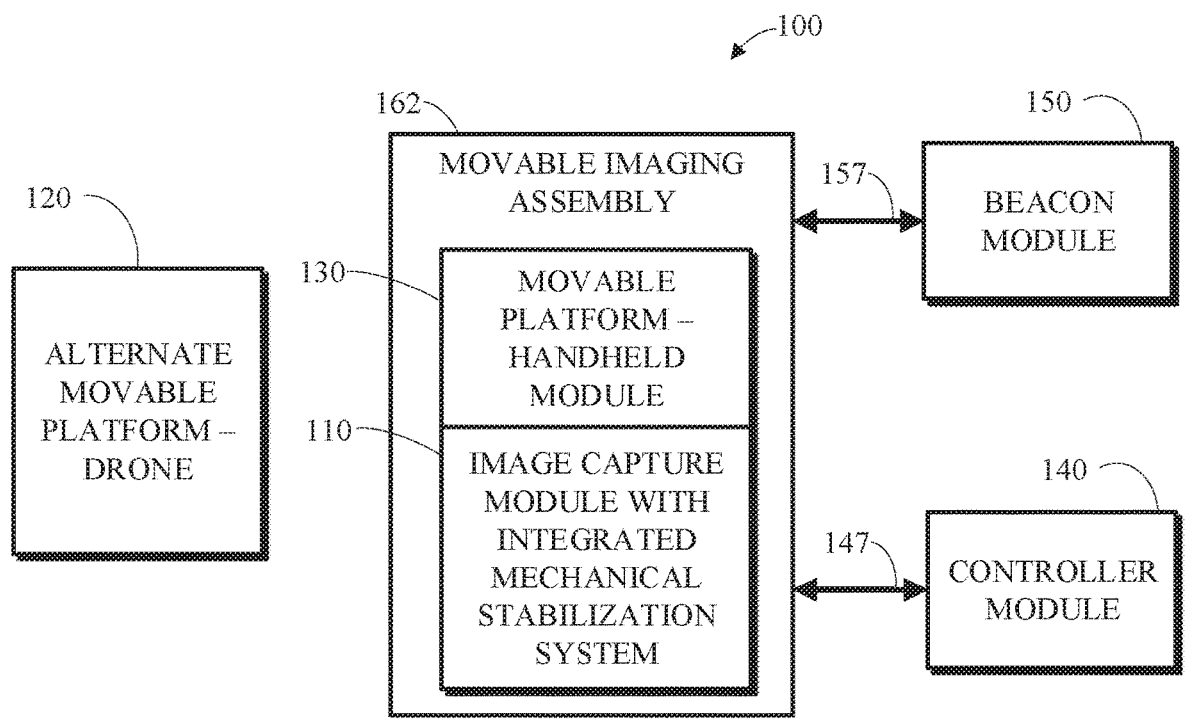
FIG. 1B is a block diagram of a movable imaging system with modular components in a second usage scenario.

FIG. 1B is a block diagram of the movable imaging system 100 with modular components in a second usage scenario. In this second usage scenario of FIG. 1B, the handheld module 130 is attached to the image capture module 110 to form a movable imaging assembly 162 that may be used to capture images (e.g., still images or video) while the movable imaging assembly 162 moves in the hand of a user and/or in response to signals from the controller module 140 and/or the beacon module 150. In this second usage scenario of FIG. 1B, the aerial vehicle 120 is disconnected from the image capture module 110.

The movable imaging system 100 includes a handheld module 130 configured to be removably attached to the image capture module 110 by the connector. In some implementations, the handheld module 130 includes a battery and a display configured to display images received from the image sensor via conductors of the connector. The handheld module 130 may be removably attached in the sense that a user can quickly connect and disconnect the handheld module 130 from the image capture module 110 without using a tool (e.g., by engaging or disengaging one or more latches, rotary-type mechanisms, or click-type mechanisms using fingers). In the second usage scenario of FIG. 1B, the handheld module 130 is connected to the image capture module 110. For example, the handheld module 130 may be the handheld module 300 of FIGS. 3A and 3B.

The handheld module 130 may include a slot that fitted to the connector of the image capture module 110, in which the connector may be inserted. For example, the handheld module 130 may include an electrical connector (e.g., a USB type C connector) nested in the slot that includes multiple conductors configured to transfer images and other data and control signals between the handheld module 130 and the image capture module 110 when they are connected to form the movable imaging assembly 162. The slot of the handheld module 130 may include one or more fastening mechanisms configured to secure the attachment of the handheld module 130 to the connector during the second usage scenario of FIG. 1B. In some implementations, the handheld module 130 includes two fastening mechanisms (e.g., latches, clasps, or rotating mechanisms) configured to secure the connector when the image capture module is attached to the handheld module. The fastening mechanisms may be positioned such that either of the two fastening mechanisms is sufficient to secure the connector. In some implementations, a gimbal of the mechanical stabilization system is substantially flush with a surface of the handheld module 130 when the image capture module is attached to the handheld module 130.

In the second usage scenario of FIG. 1B, for example, the movable imaging assembly 162 may be carried in a hand of a user who is able to point the image sensor at subjects for image capture and control image capture through a user interface (e.g., buttons and/or a touchscreen) of the handheld module 130. The user may view or preview captured images on a display of the handheld module 130. The battery of the handheld module 130 may provide power to the image capture module 110 during the second usage scenario.

In the second usage scenario of FIG. 1B, for example, the movable imaging assembly 162 may be mounted on a person or an object using a fastening article (e.g., a strap or helmet mount). For example, a skier may wear a strap or vest with a portion configured to hold the movable imaging assembly 162 in place on a portion of the skier's body (e.g., on the arm or chest) to capture images from their perspective as they move with their hands free down a slope. For example, the movable imaging assembly 162 may be positioned or mounted in a fixed location (e.g., on a tree branch or resting on the surface of a table). The movable imaging assembly 162 may be controlled by the controller module 140 while mounted to adjust an orientation of the image sensor using the mechanical stabilization system (e.g., three gimbals and motors) and control other image capture features (e.g., snap a still image or adjust exposure time). Information (e.g., control signals and/or image data) may be transferred between the movable imaging assembly 162 and the controller module via the wireless link 147. For example, the wireless link 147 may utilize a wireless interface standard, such as WiFi, Bluetooth (BT), cellular data link, ZigBee, or ANT+ link. For example, images (e.g., still images or video at full resolution or at reduced resolution) captured by the movable imaging assembly 162 may be received by the controller module 140 and displayed on a touch-screen display to the user. The movable imaging assembly 162 may wirelessly receive position data from the beacon module 150 to enable the image sensor to follow the beacon module 150 by adjusting the orientation of the image sensor using the mechanical stabilization system. The position data may be received via a wireless link 157. For example, the wireless link 155 may utilize a wireless interface standard, such as WiFi, Bluetooth (BT), cellular data link, ZigBee, or ANT+ link. In some implementations, the movable imaging assembly 162 is configured to communicate wirelessly with both the beacon module 150 and the controller module 140 to enable following of a subject with the beacon module 150 with some supervision from a user of the controller module 140.

Although not explicitly shown in FIGS. 1A and 1B, the movable imaging system 100 may include additional components to facilitate image capture under diverse and potentially motion intensive circumstances. For example, the movable imaging system 100 may include a detachable flight battery for powering the aerial vehicle 120 and an AC charger for quickly charging the flight battery between flights in the first usage scenario. In some implementations, multiple detachable flight batteries are included in the movable imaging system 100 to continue use while a detachable flight battery is charging. For example, the movable imaging system 100 may include an AC charger for quickly charging the handheld module 130. For example, the movable imaging system 100 may include a mounting device (e.g., a strap, helmet mount, or mini tripod or wide base) for the handheld module 130. For example, the movable imaging system 100 may include one or more carrying cases for components of the movable imaging system 100. For example, the movable imaging system 100 may include cables (e.g., USB type C cable and HDMI cable) that can be used to connect a personal computing device (e.g., a smartphone, a tablet, or a laptop) to the image capture module 110, the aerial vehicle 120, and/or the handheld module 130 to perform bulk transfers of data (e.g., image data) and/or update software running on a processing apparatus of these components of the movable imaging system 100. An application may be installed on one or more external computing devices (e.g., a smartphone, a tablet, or a laptop) to facilitate pulling and sharing captured video content from the image capture module 110 and facilitating software upgrades to the image capture module 110, the aerial vehicle 120, the handheld module 130, and/or the controller module 140. The one or more external computing devices may communicate with the image capture module 110 via a wireless communications link or a wired communications link (e.g., a HDMI link). The application running on the external computing device may be configured to perform a variety of operations related to camera configuration, control of video acquisition, and/or display of video captured by the image capture module 110. An application (e.g., GoPro App®) may enable a user to create short video clips and share video clips to a cloud service (e.g., Instagram®, Facebook®, YouTube®, Dropbox®); perform remote control of functions of the image capture module 110; live preview video being captured for shot framing; mark key moments while recording (e.g., HiLight Tag®, View HiLight Tags in GoPro Camera Roll®) for location and/or playback of video highlights; wirelessly control camera software; and/or perform other functions.

There may be multiple microphones positioned on the modular components of the movable imaging system 100. For example, an image capture module 110 may include two microphones positioned to facilitate the capture of stereo sound. For example, a single microphone may be included in the handheld module 130 (e.g., positioned on or near a side of the handheld module 130 that includes a display (e.g., the display 310). The microphone of the handheld module 130 may be used enable the suppression of wind noise. Having microphones on the image capture module 110 and the handheld module 130 may provide for diverse, well-spaced microphone locations on the movable imaging assembly 162, which may enable or improve noise suppression functions. A microphone located on the side of the handheld module 130 with the display may facilitate recording video with sound in a selfie use case for the movable imaging assembly 162. Having a single microphone in the handheld module may also reduce battery draining. In some implementations, multiple microphones are included on the handheld module 130 (e.g., to support the capture of stereo sound).

In some implementations, the movable imaging system 100 includes additional alternative movable platforms that are configured to be removably attached to the image capture module 110 by the connector. For example, alternative aerial vehicles with different size and range may be included. For example, an automated or autonomous land-based movable vehicle (e.g., a remote control car) may be included the movable imaging system 100 to support image capture in different circumstances, such as during a road race.

In some implementations, the movable imaging system 100 includes additional alternative image capture modules with a connector like the connector of the image capture module 110 that is compatible to be removably attached to the aerial vehicle 120 and the handheld module 130. This may enable swapping out different versions of the image capture module 110 to tailor image capture capabilities to different usage scenarios. For example, some image capture modules may have only a single image sensor, while some image capture modules may have multiple image sensors and support panoramic image capture with stitching.

In some implementations (not shown), a handheld module, with features similar to the handheld module 130, is integrated with an image capture module, with features similar to the image capture module 110, as a combined handheld image capture module. The combined handheld image capture module includes an image sensor, an integrated mechanical stabilization system configure to control an orientation of the image sensor, a display, a battery large enough to support operation similar to that described in the second usage scenario of FIG. 1B, and a connector configured to be removably attached to an aerial vehicle, which may be similar to the aerial vehicle 120, or another alternative movable platform. For example, this aerial vehicle may include a hole or transparent panel in the bottom of the aerial vehicle through which the display and/or control interface of the combined handheld image capture module is visible and/or accessible while the combined handheld image capture module is attached to the aerial vehicle. In some implementations, the display to the combined handheld image capture module may be powered down by default when the combined handheld image capture module is attached to the aerial vehicle.

In some implementations (not shown), a movable imaging system with modular components includes an image capture module without an integrated mechanical stabilization system that instead includes one or more modular mechanical stabilization systems (e.g., gimbals and motors) that are configured to be removably attached to the image capture module and multiple movable platforms. The one or more modular mechanical stabilization systems may be configured to control a relative orientation of an image sensor of the image capture module and a movable platform (e.g., an aerial vehicle or a handheld module) that is currently attached. For example, multiple alternative modular mechanical stabilization systems may be included in this movable imaging system with different size, weight, and performance characteristics that are suited to different circumstances.

In some circumstances, it is desirable to track a target, which may include one or more subjects, with a movable imaging assembly (e.g., the movable imaging assembly 160). Various forms of tracking may be utilized, including those discussed below and in U.S. Provisional Patent Application Ser. No. 62/364,960, filed Jul. 21, 2016, and herein incorporated by reference in its entirety. A tracking system may be utilized to implement the described forms of tracking. The tracking system may comprise a processor and algorithms that are used for tracking the target. A tracking system may be included entirely within the movable imaging assembly (e.g., the movable imaging assembly 160 or the movable imaging assembly 162) or entirely within the controller module 140 or an external computing device (e.g., a smartphone, a tablet, or a laptop) in communication with the movable imaging assembly, or portions of a tracking system may be located or duplicated within a movable imaging assembly and the controller module 140 or an external computing device. A voice recognition system may also be utilized to interact with the tracking system and issue commands (e.g., commands identifying or adjusting a target).

Figure 2A:
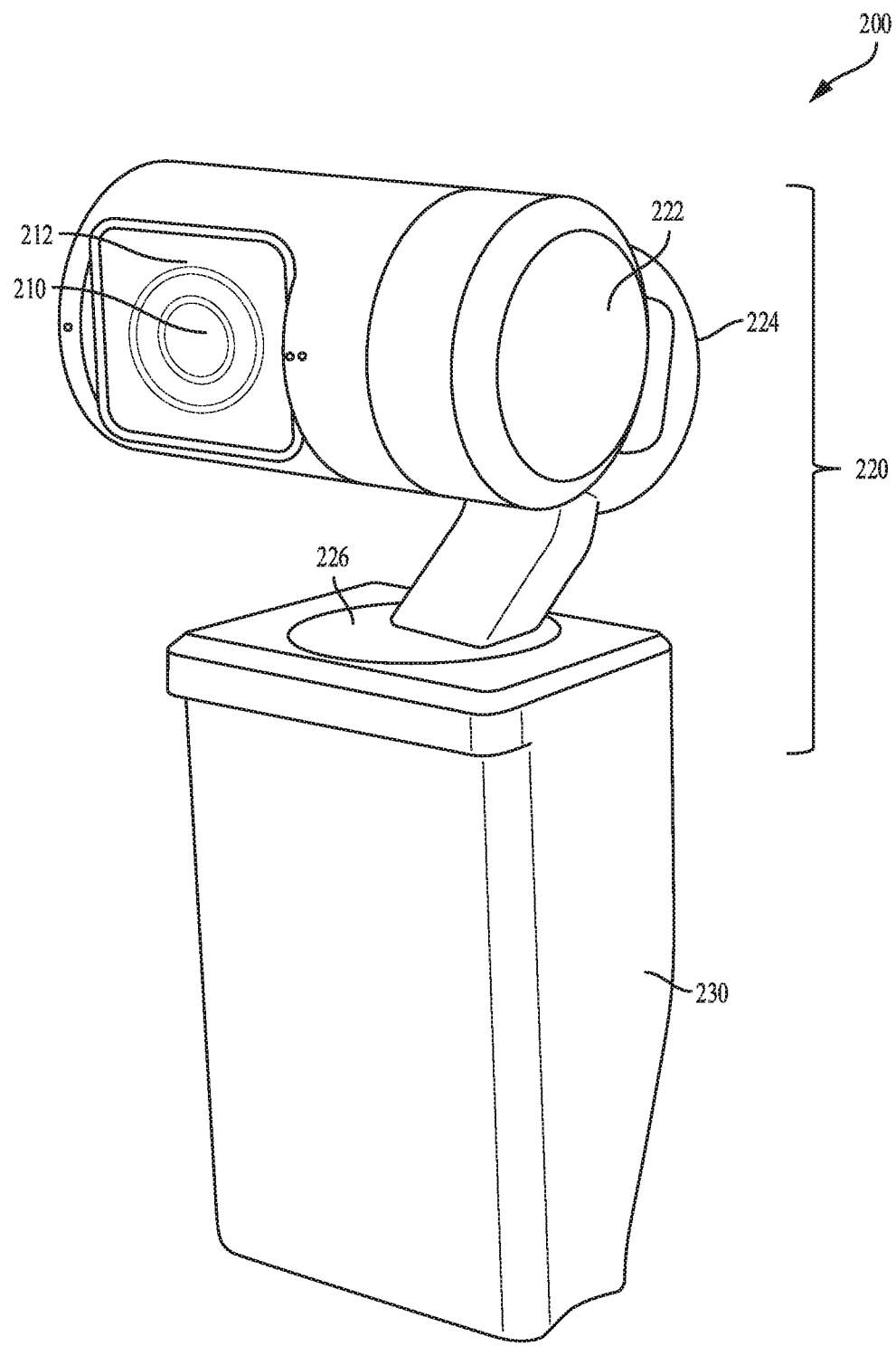
FIG. 2A is a pictorial illustration of an example of an image capture module from a first perspective.
Figure 2B:
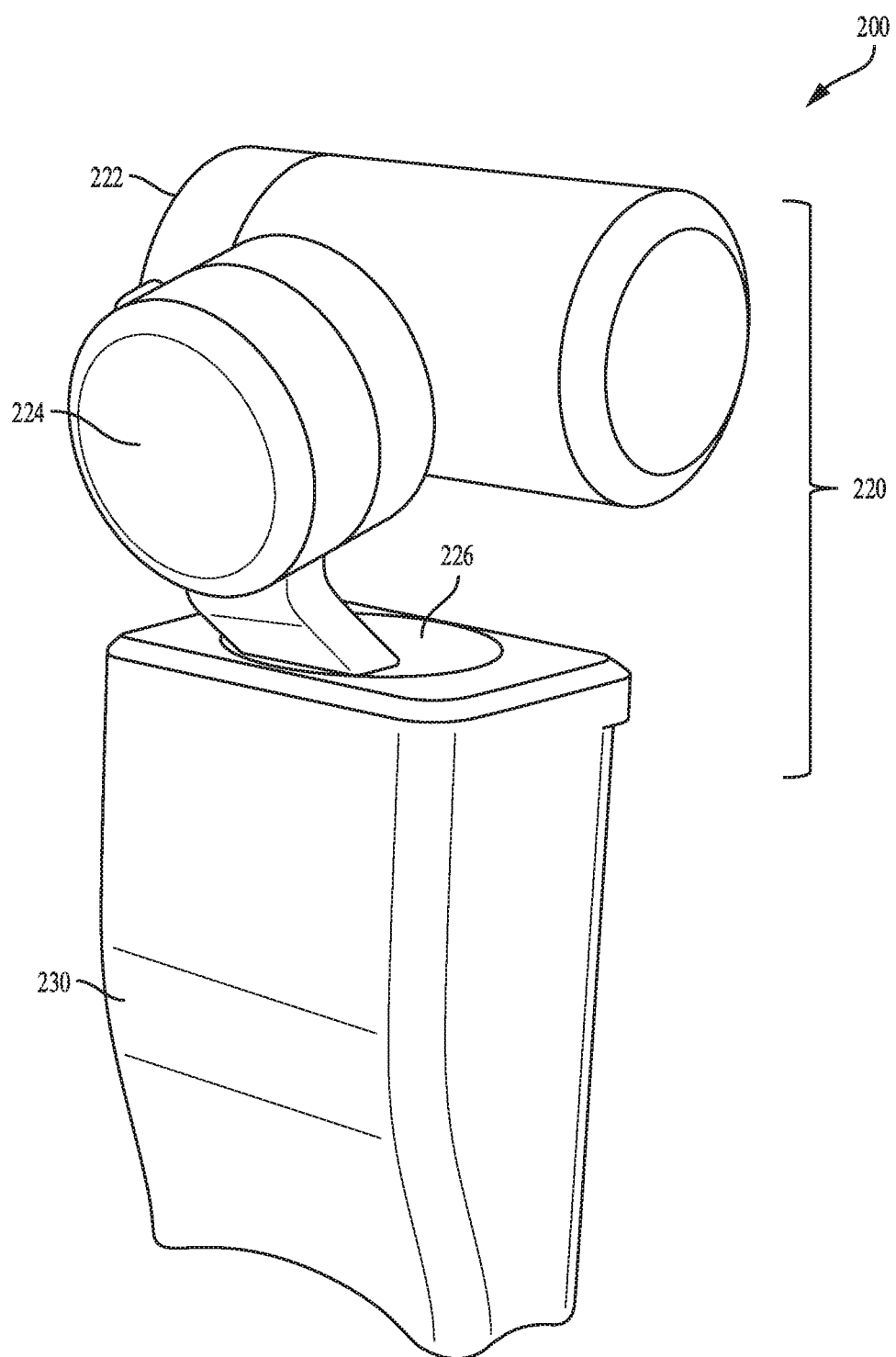
FIG. 2B is a pictorial illustration of an example of an image capture module from a second perspective.

FIGS. 2A and 2B are pictorial illustrations of an example of an image capture module 200 from two perspectives. The image capture module 200 includes an image sensor 210 configured to capture images; a mechanical stabilization system 220, including gimbals and motors (222, 224, and 226); and a connector 230 configured to interchangeably connect the mechanical stabilization system to an aerial vehicle (e.g., the aerial vehicle 120) and a handheld module (e.g., the handheld module 130).

The image capture module 200 includes an image sensor 210 configured to capture images (e.g., still images or frames of video). The image sensor 210 may be configured to detect light of a certain spectrum (e.g., the visible spectrum or the infrared spectrum) and convey information constituting an image as electrical signals (e.g., analog or digital signals). For example, the image sensor 210 may include charge-coupled devices (CCD) or active pixel sensors in complementary metal-oxide-semiconductor (CMOS). The image capture module 200 includes a lens 212 (e.g., a wide-angle rectilinear lens). The image sensor 210 detects light from the environment that is incident through the lens 212.

The image capture module 200 may also include a processing apparatus (e.g., including memory, an image signal processor, a hardware encoder, a microcontroller, and/or other processor) that is configured to track a user based on position data from a beacon module (e.g., the beacon module 150) and based on computer vision tracking of the user in images from the image sensor 210. In some implementations, the processing apparatus may be configured to perform image processing operations (e.g., correction of dead pixels, band processing, decoupling of vertical blanking, spatial noise reduction, temporal noise reduction, automatic white balance, global tone mapping, local tone mapping, lens distortion correction, electronic rolling shutter correction, electronic image stabilization, output projection, and/or encoding) on images captured by the image sensor 210. In some implementations, some or all of the image processing operations are performed on the images captured by the image sensor by a processing apparatus that is located in whole or in part in another component of a larger movable imaging system 100. For example, the processing apparatus may be located inside the connector 230 below the gimbal 226 of the mechanical stabilization system 220.

The image capture module 200 includes a mechanical stabilization system 220, including gimbals and motors (222, 224, and 226), that is integrated with the image sensor 210 in the image capture module 200 and configured to control an orientation of the image sensor 210. For example, the gimbals and motors (222, 224, and 226) may enable rotation of the image sensor with three degrees of freedom. In some implementations, the gimbals and motors (222, 224, and 226) respectively enable a wide range of rotation angles (e.g., up to 180 degrees, 270 degrees or 360 degrees). A gimbal 226 of the mechanical stabilization system 220 is substantially flush with a surface of the connector 230 causing the mechanical stabilization system 220 to have a low profile and protect the gimbal 226 from damage. For example, the mechanical stabilization system 220 may be controlled with a controller (e.g., a proportional integral derivative controller) based on target orientations determined by a processing apparatus based on image data from the image sensor 210, motion sensor data from a motion sensor in the image capture module 200 or moving platform (e.g., the aerial vehicle 120 or the handheld module 130) to which the image capture module 200 module is attached, and/or position data for a tracking target from a beacon (e.g., the beacon module 150).

The mechanical stabilization system 220 may be configured to enable an electronically actuated transport mode. When many 3-axis gimbals are powered off they simply float around aimlessly and are cumbersome to put away or transport. In some implementations, the mechanical stabilization system 220 is configured to enable an electronically actuated transport mode in which: upon the occurrence of triggering event (e.g., a specialized user command or a command to power OFF the image capture module 200 or the mechanical stabilization system 220, each of the gimbals and motors (222, 224, and 226) are electronically controlled to assume a fold-flat position and maintain that position for a fixed time period (e.g., 10, 30, or 60 seconds), allowing the user to easily slip the image capture module 200 into a pocket, carrying case, backpack, or other container. After the time has expired, the mechanical stabilization system 220 will completely power OFF allowing the gimbal arms to move freely, once in the desired transport location. In some implementations, this electronically actuated transport mode can be accompanied by a physical lock which is either integrated into the gimbal itself, or via an external means such as a bracket or carrying case. For example, the electronically actuated transport mode may be implemented using electronic motor position sensors, mechanical fold-flat ability (range-of-motion), and firmware control (e.g., implemented in a processing apparatus of the image capture module 200).

The image capture module 200 includes a connector 230 configured to interchangeably connect the mechanical stabilization system 220 to an aerial vehicle (e.g., the aerial vehicle 120) and a handheld module (e.g., the handheld module 130). The connector may be keyed to a slot of the aerial vehicle and keyed to a slot of the handheld module. The connector 230 is keyed by virtue of the shape of an outer surface of the connector 230, which is fitted to the corresponding shape of the slot in the aerial vehicle (e.g., the aerial vehicle 500) and the corresponding shape in the slot of the handheld module (e.g., the handheld module 300). The keyed shape of the connector 230 includes some asymmetry (i.e., the rectangular cross-section of the connector 230 that narrows, sloping inward, about half way down the connector 230 on one side), which may facilitate easy connection of the aerial vehicle and the handheld module to the image capture module 200 by preventing a user from accidentally inserting the connector 230 in an improper orientation. For example, the connector 230 may include two fastening mechanisms configured to secure the connector 230 when the image capture module 200 is attached to the handheld module. The fastening mechanisms may be configured such that either of the two fastening mechanisms is sufficient to secure the connector 230. The connector 230 includes an electrical connector (e.g., a universal serial bus (USB) type C connector) nested inside of the keyed outer portion of the connector 230. The electrical connector may include multiple conductors that can be used to provide power from a movable platform (e.g., the aerial vehicle 500 or the handheld module 300) to the image capture module 200 and transfer communication signals (e.g., USB 2.0, USB 3.0, I2C, SPI, and/or MIPI signals) between the movable platform and the image capture module 200 when they are connected. In some implementations, the connector 230 includes pairs of conductors respectively used to transfer power to the image capture module 200, bulk transfer data from the image capture module 200, transfer control signals to the image capture module 200, and transfer real-time video data from the image capture module 200.

The connector may include an electrical connector (e.g., a universal serial bus (USB) type C connector) nested inside of the keyed outer portion of the connector. The electrical connector may include multiple conductors that can be used to provide power from the aerial vehicle 120 to the image capture module 110 and transfer communication signals (e.g., USB 2.0, USB 3.0, I2C, SPI, and/or MIPI (Mobile Industry Processor Interface) signals) between the aerial vehicle 120 and the image capture module 110 when they are connected. For example, conductors of the connection may be used to transfer power, high-speed bulk data transfers, real-time embedded control signaling, and/or raw video signals at a capture frame rate. For example, the connector may include pairs of conductors respectively used to transfer power to the image capture module 110, bulk transfer data from the image capture module 110, transfer control signals to the image capture module 110, and transfer real-time video data from the image capture module 110.

Figure 3A:
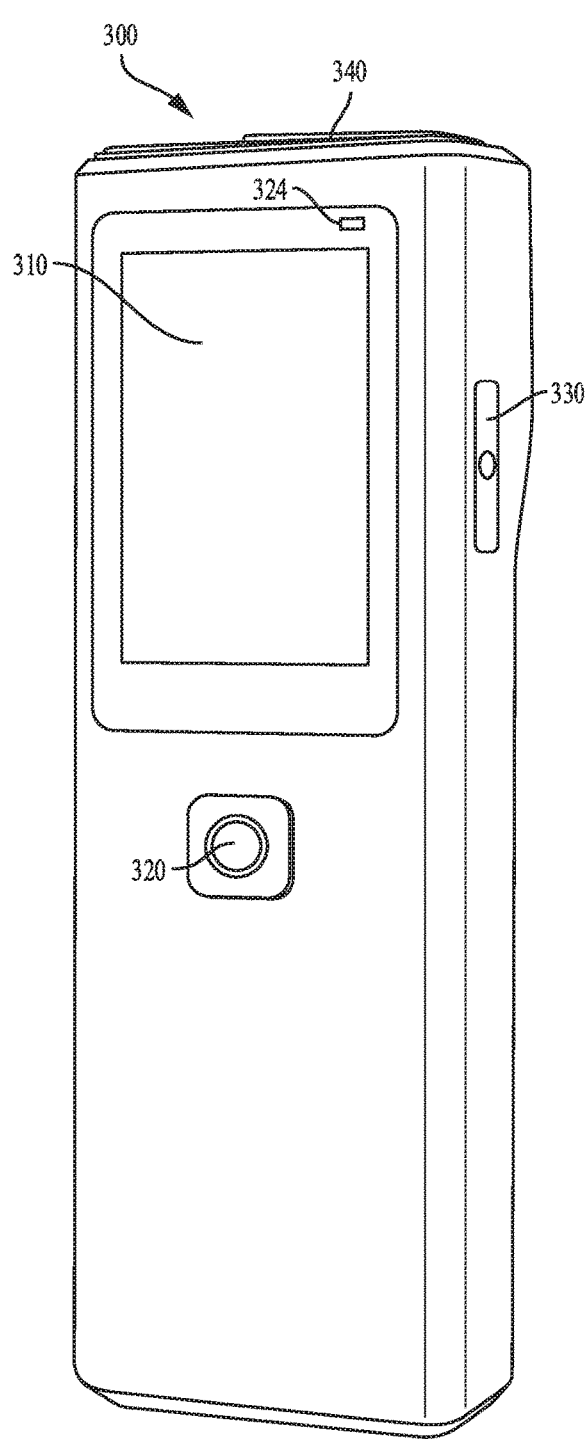
FIG. 3A is a pictorial illustration of an example of a handheld module from a first perspective.
Figure 3B:
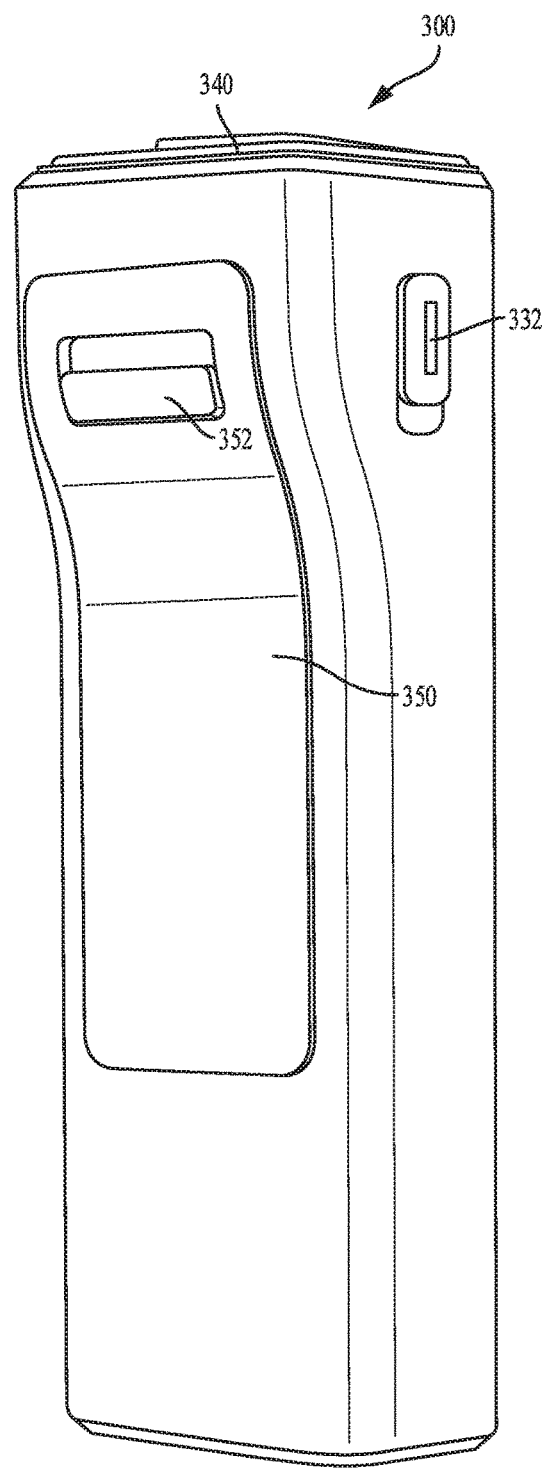
FIG. 3B is a pictorial illustration of an example of a handheld module from a second perspective.

FIGS. 3A and 3B are pictorial illustrations of an example of a handheld module 300 from two perspectives. The handheld module 300 includes a display 310, a record button 320, a status indicator light 324, a first fastening mechanism 330 and a second fastening mechanism 332, a slot 340 with a shape matched to the connector 230 of the image capture module 200, and a battery cover 350 with a battery release latch 352.

The handheld module 300 may be shaped such that it may be ergonomically held in a hand during use. The outer material may be selected to have a rubbery grip texture.

The handheld module 300 includes a user interface that allows a user to control image capture with an attached image capture module (e.g., the image capture module 200). The user interface includes the display 310 for viewing captured images, the record button 320 for snapping still images or starting or stopping recording of video, and the status indicator light 324. The status indicator light 324 may include a multi-color LED device and may reflect the status of an electronic connection to an attached image capture module and/or a recording state. In some implementations, the display 310 is a touch-screen that enables the input of additional commands by a user. For example, a user may input commands to change a gimbal angle; enter "selfie-mode", where the gimbal 226 is rotated 180 degrees; or "HiLight Tag", to mark an image or frames of video as significant with metadata.

The first fastening mechanism 330 and the second fastening mechanism 332 are configured to secure the connector 230 of the image capture module 200 when it is inserted in the slot 340 to attach the handheld module 300 to the image capture module 200. The first fastening mechanism 330 and the second fastening mechanism 332 include a button and a slider, respectively, that may be used to disengage the first fastening mechanism 330 and the second fastening mechanism 332 in order to disconnect from and attached image capture module (e.g., the image capture module 200). Other types of fastening mechanisms are also possible.

The battery cover 350 may be opened using the battery release latch 352 to access a battery of the handheld module 300 for replacement or recharging.

Figure 4A:
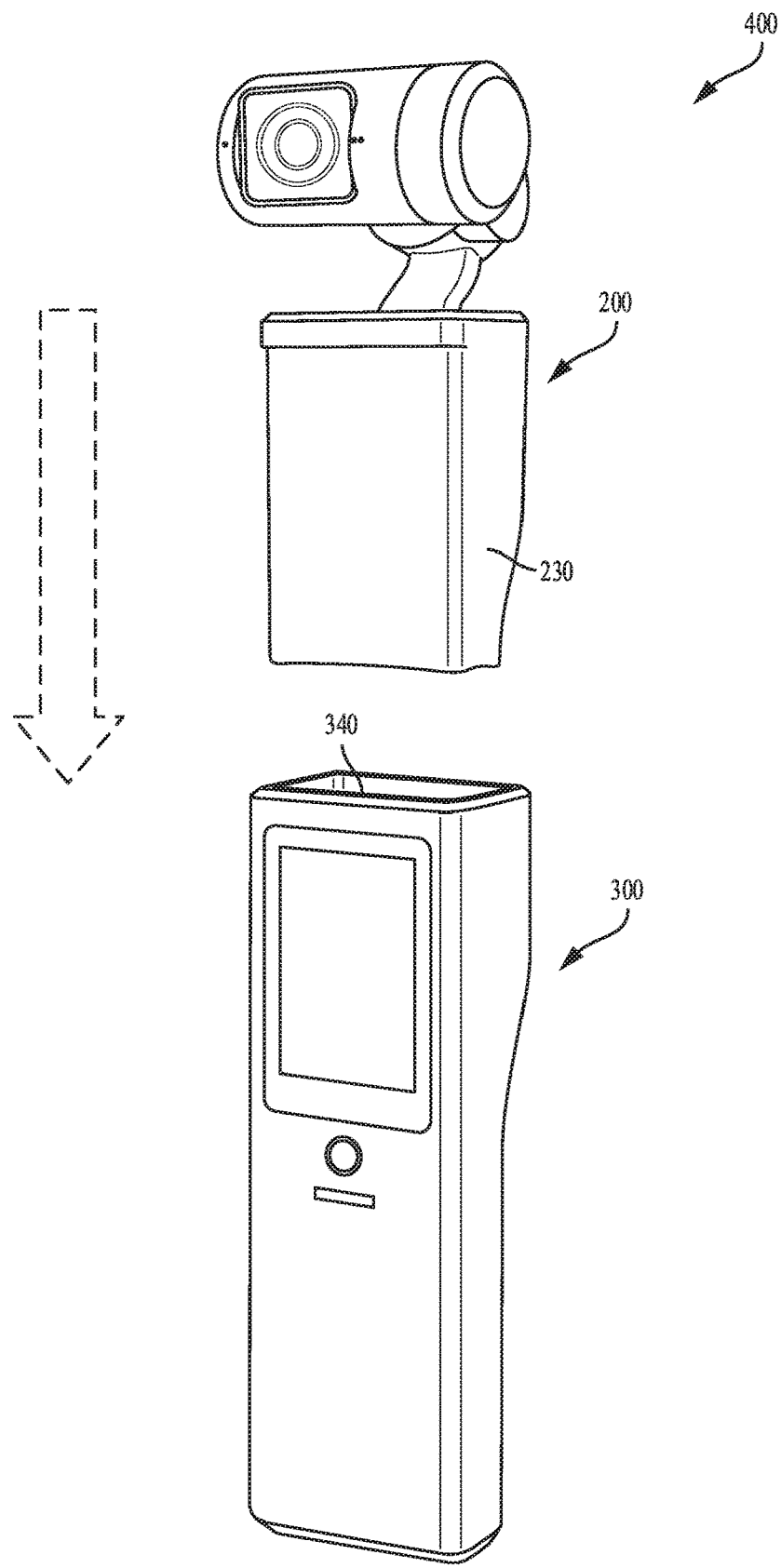
FIG. 4A is a pictorial illustration of a handheld module oriented to be connected to an image capture module.

FIG. 4A is a pictorial illustration of a handheld module 300 oriented to be connected to an image capture module 200 to form a movable imaging assembly 400. The connector 230 of the image capture module 200 is keyed to the slot 340 of the handheld module 300. From the illustrated orientation, the image capture module 200 may be moved down to slide the connector 230 into the slot 340 to attach the image capture module 200 to the handheld module 300 to form the movable imaging assembly 400. When the connector 230 is inserted into the slot 340, paired fastening mechanisms (e.g., latches) in the connector 230 and the slot 340 may engage to secure the newly formed connection. For example, spring loaded latches may engage to secure the connection of the movable imaging assembly 400. As part of the connection, mated electronic connectors (e.g., USB Type C connectors) nested in the connector 230 and the slot 340 may engage to form an electronic connection including multiple conductors, which may be used to supply power from the handheld module 300 to image capture module 200 and to transfer control signals and data (e.g., image data) between the attached modules of the movable imaging assembly 400.

When a user seeks to disconnect the handheld module 300 from the image capture module 200, they may release these fastening mechanisms. For example, latches may be manually released by a user using their fingers on buttons or release levers. In some implementations, two latches must be simultaneously released in order to disconnect the handheld module 300 from the image capture module 200, which may reduce the risk of accidental disconnection. For example, a cycle of connecting and disconnecting the handheld module 300 from the image capture module 200 may only take a few seconds for a user to complete.

Figure 4B:
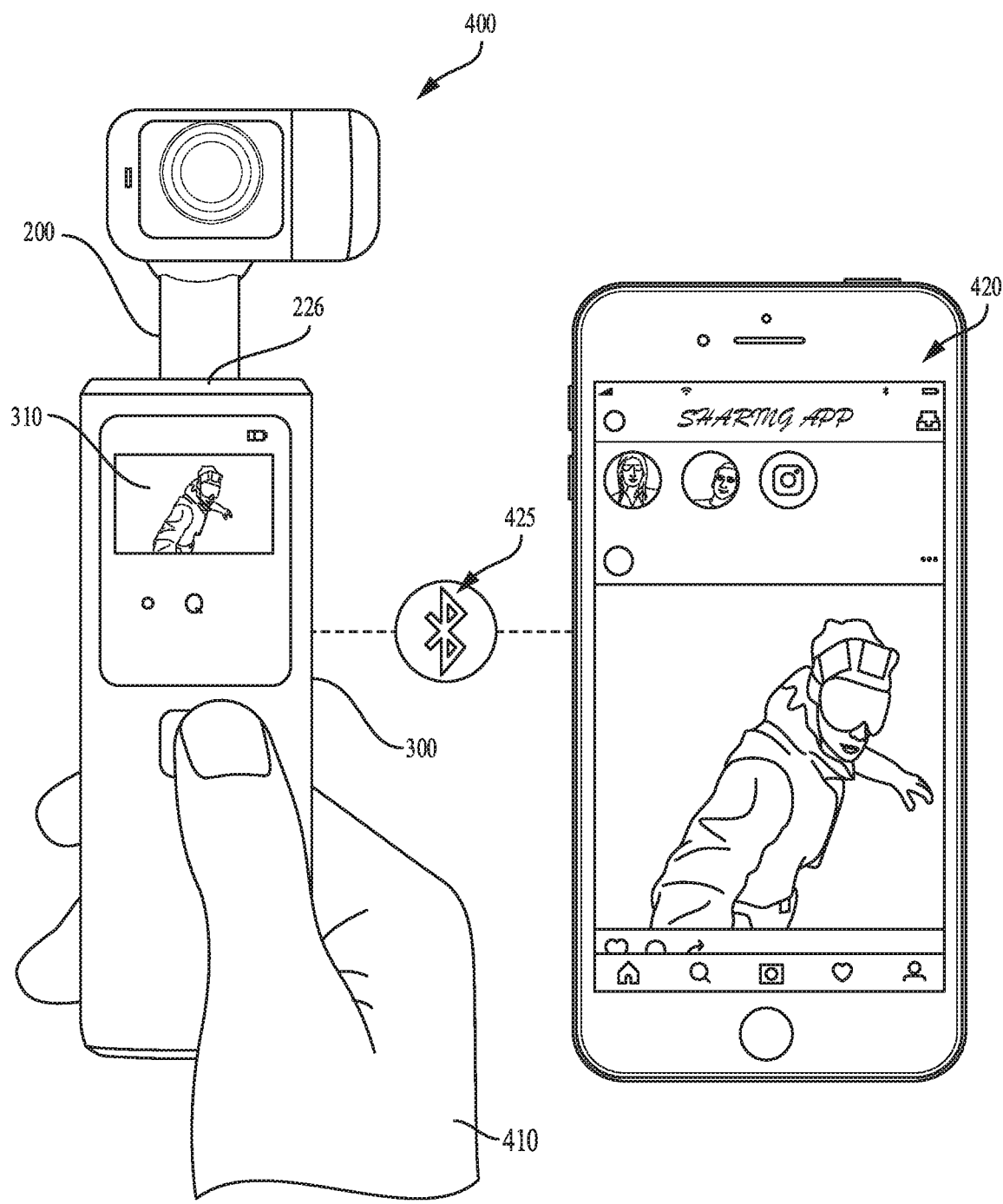
FIG. 4B is a pictorial illustration of an example of a movable imaging assembly in communication with a personal computing device.

FIG. 4B is a pictorial illustration of an example of a movable imaging assembly 400 in communication with a personal computing device 420. In the usage scenario of FIG. 4B, the movable imaging assembly 400 is held in a hand 410 of a user and is capturing images (e.g., still images or frames of video) of the user. The captured images are displayed on the display 310 of the handheld module 300. The captured images may be transferred to the personal computing device 420 (e.g., a smartphone) via a wireless link 425 (e.g., using a Bluetooth interface). The personal computing device 420 may then be used to display and/or share or otherwise transmit and distribute the captured images. The personal computing device 420 may also be configured with an application that may be used to remotely control image capture functions of the movable imaging assembly 400 and/or update software installed on a processing apparatus of the movable imaging assembly 400.

In this example, a gimbal 226 of the mechanical stabilization system is substantially flush with a surface (e.g., the top surface) of the handheld module 300 when the image capture module 200 is attached to the handheld module 300. This may result in the mechanical stabilization system and the image sensor having a low profile and protecting the gimbal 226 to reduce risk of damage to the gimbal 226.

Figure 5A:
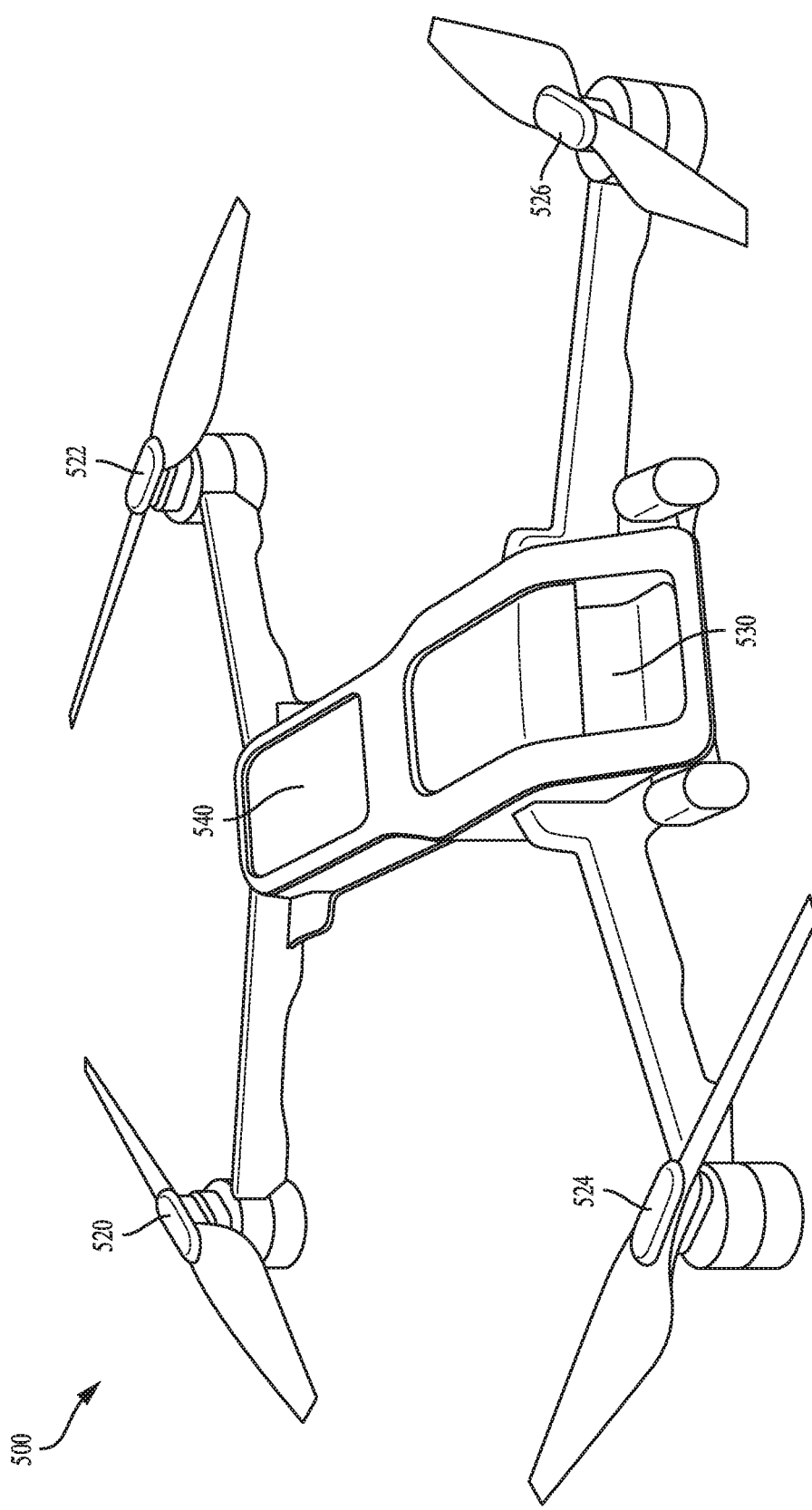
FIG. 5A is a pictorial illustration of an example of an aerial vehicle.

FIG. 5A is a pictorial illustration of an example of an aerial vehicle 500. In this example, the aerial vehicle 500 is quadcopter drone. The aerial vehicle 500 includes four propellers (520, 522, 524, and 526); a slot 530 that is shaped to match the connector 230 of the image capture module 200; and a detachable flight battery 540. The propellers (520, 522, 524, and 526) are control surfaces that may be controlled via respective motors to control the motion of the aerial vehicle 500. For example, the aerial vehicle 500 may include an electrical connector (e.g., a USB type C connector) nested in the slot 530 that includes multiple conductors configured to transfer images and other data and control signals between the aerial vehicle 500 and the image capture module 200 when they are attached by inserting the connector 230 in the slot 530. In some implementations, the detachable flight battery 540 may be charged quickly with a high speed AC charging station when the detachable flight battery 540 is removed from the aerial vehicle 500

Figure 5B:
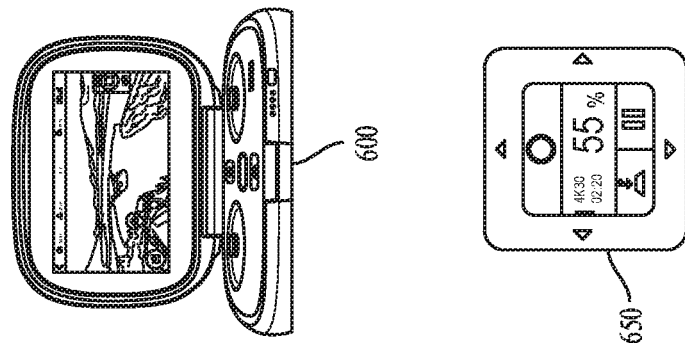
FIG. 5B is a pictorial illustration of an example of a movable imaging assembly in communication with a controller module and a beacon module.
Figure 5B:
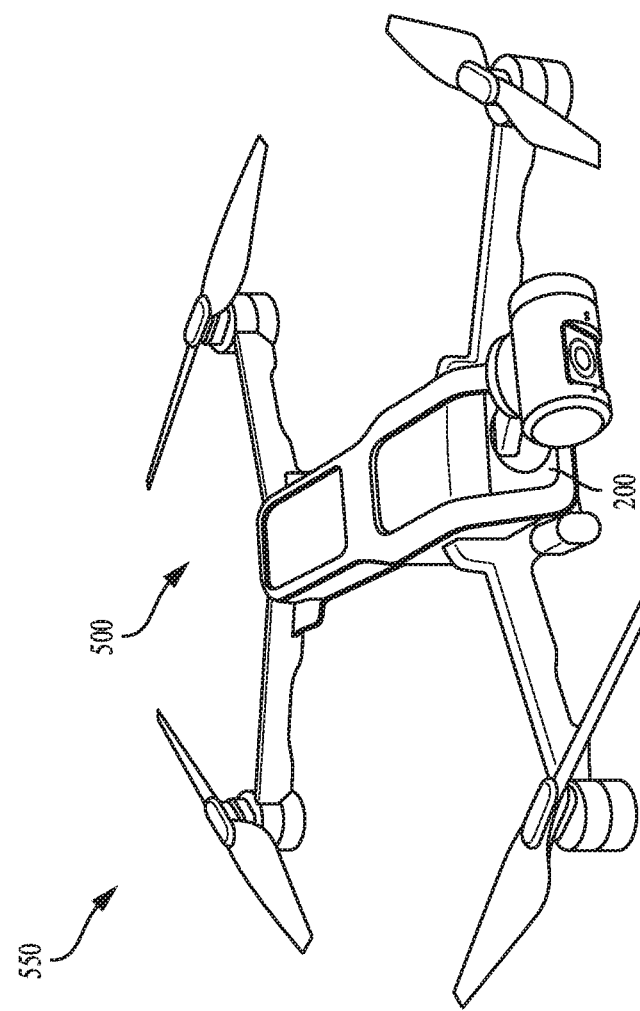

FIG. 5B is a pictorial illustration of an example of a movable imaging assembly 550 in communication with a controller module 600 and a beacon module 650. The movable imaging assembly 550 is formed when the image capture module 200 is attached to the aerial vehicle 500 by inserting the connector 230 into the slot 530. When the connector 230 is inserted into the slot 530, paired fastening mechanisms (e.g., latches) in the connector 230 and the slot 530 may engage to secure the newly formed connection. For example, spring loaded latches may engage to secure the connection of the movable imaging assembly 550. As part of the connection, mated electronic connectors (e.g., USB Type C connectors) nested in the connector 230 and the slot 530 may engage to form an electronic connection including multiple conductors, which may be used to supply power from the aerial vehicle 500 to the image capture module 200 and to transfer control signals and data (e.g., image data) between the attached modules of the movable imaging assembly 550.

When a user seeks to disconnect the aerial vehicle 500 from the image capture module 200, they may release these fastening mechanisms. For example, latches may be manually released by a user using their fingers on buttons or release levers. In some implementations, two latches must be simultaneously released in order to disconnect the aerial vehicle 500 from the image capture module 200, which may reduce the risk of accidental disconnection. For example, a cycle of connecting and disconnecting the aerial vehicle 500 from the image capture module 200 may only take a few seconds for a user to complete.

The movable imaging assembly 550 may be in communication via wireless links with the controller module 600 and the beacon module 650. In some implementations, the movable imaging assembly 550 is configured to communicate wirelessly with both the beacon module 650 and the controller module 600. Communicating with both the beacon module 650 and the controller module 600 may allow a first user to actively monitor and/or control image capture of the images by the movable imaging assembly 550 from the controller module 600 while the movable imaging assembly 550 follows a second user or other object that is bearing the beacon module 650 passively while moving. This may enable following objects (e.g., animals) that are unable to issue commands to the movable imaging assembly 550 or make the experience of being followed more natural and less mentally taxing for the second user, so the second user can focus their attention on other activities (e.g., skiing, surfing, or mountain biking). The first user can focus on optimizing other aspects of image capture (e.g., choosing perspective on the subject, zooming, or timing snaps of still images) while autonomous functions of the movable imaging assembly 550 handle the following and navigation tasks.

Figure 6A:
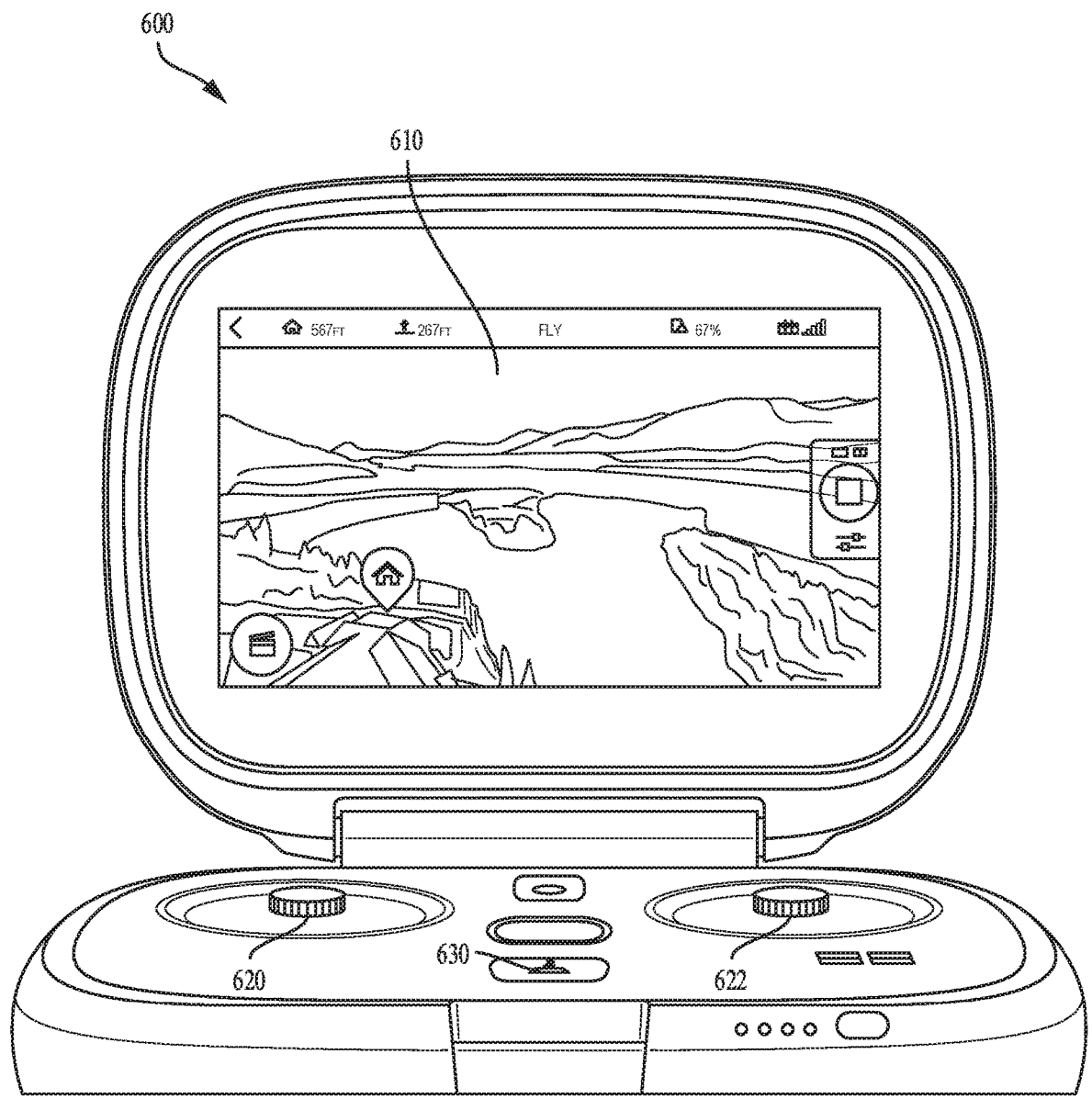
FIG. 6A is a pictorial illustration of an example of a controller module.

FIG. 6A is a pictorial illustration of an example of a controller module 600. The controller module 600 may be configured to wirelessly communicate with a movable imaging assembly (e.g., the movable imaging assembly 400 or the movable imaging assembly 550) to control motion of the movable imaging assembly and/or capture of images. The controller module 600 includes a display 610 configured to present images captured by the movable imaging assembly and status information for the movable imaging assembly. For example, the status information for the movable imaging assembly may include a battery remaining indicator, a video recording indicator, an encoding state (e.g., 4K video at 30 frames per second and a recording time), a flight mode (e.g., leash mode, mimic mode, or tripod mode), flight event notices, and/or user prompts. The display 610 may be a touch-screen display that enables the entry of commands (e.g., to select a subject/target for tracking from an image displayed on the display 610). The controller module 600 includes a left joystick 620 and a right joystick 622 for controlling motion of the movable imaging assembly and/or panning of an image sensor (e.g., the image sensor 210) using a mechanical stabilization system (e.g., the mechanical stabilization system 220) of the movable imaging assembly. The controller module 600 includes buttons 630 including, for example, a power button and a record button. The controller module 600 may also include a microphone for receiving voice commands to be relayed to the movable imaging assembly.

Figure 6B:
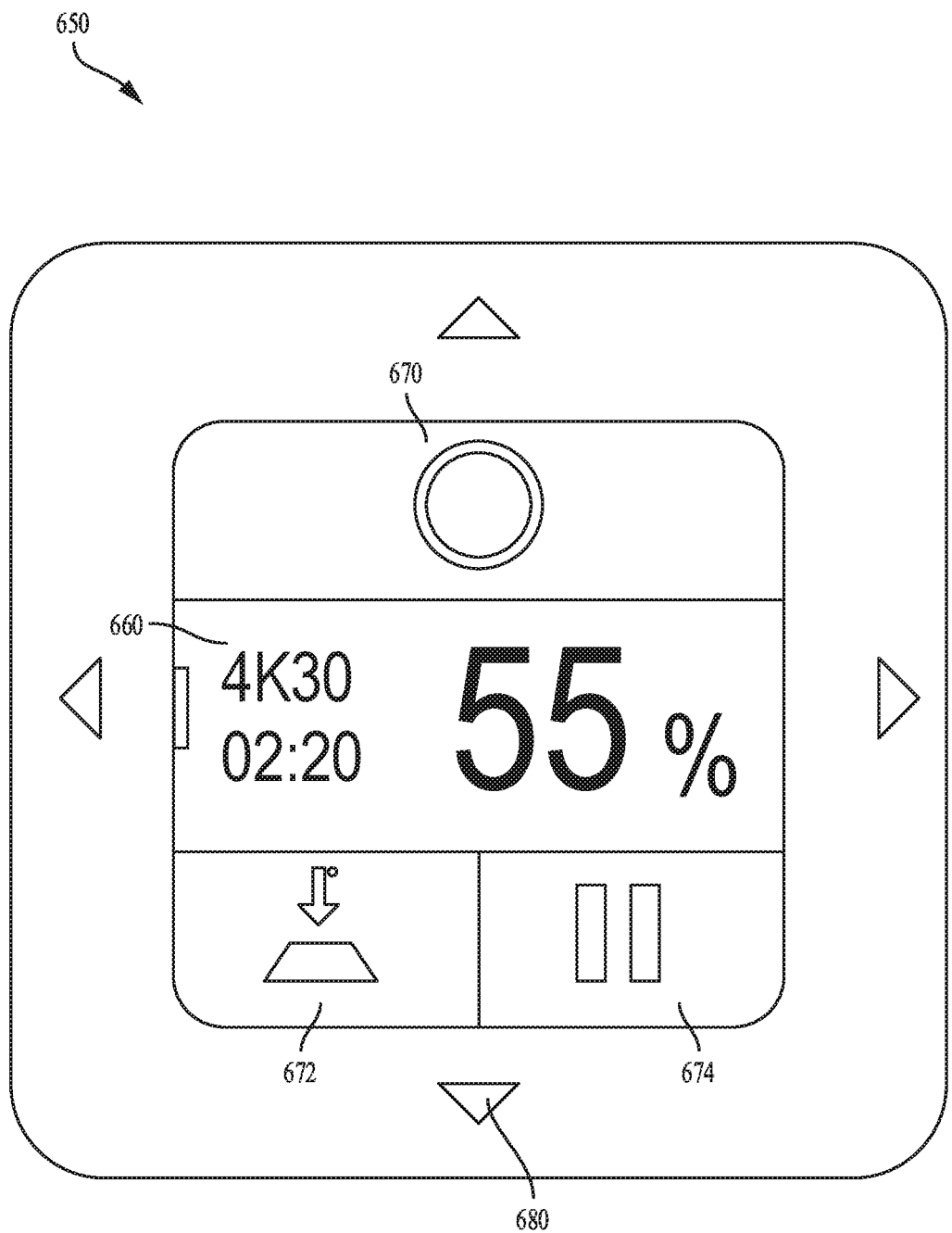
FIG. 6B is a pictorial illustration of an example of a beacon module.

FIG. 6B is a pictorial illustration of an example of a beacon module 650. The beacon module 650 may be configured to wirelessly transmit position data to a movable imaging assembly (e.g., the movable imaging assembly 400 or the movable imaging assembly 550) to enable the movable imaging assembly to follow the beacon module 650. The position data may be transmitted via a wireless communications link. For example, the beacon module 650 may include a GPS receiver and the position data may include GPS coordinates of the beacon module 650. In some implementations, beacon module 650 includes an inertial measurement unit (e.g., including accelerometers, gyroscopes, and/or magnetometers) and the position data includes changes in the position and/or orientation of the beacon module 650 that are sensed by the inertial measurement unit. For example, the wireless communications link may utilize a wireless interface standard, such as WiFi, Bluetooth (BT), cellular data link, ZigBee, or ANT+. The beacon module 650 may include a waterproof housing to enable users to bear the beacon module 650 in a variety of usage scenarios.

The beacon module 650 includes a user interface that allows a user to monitor status of the movable imaging assembly (e.g., the movable imaging assembly 400 or the movable imaging assembly 550) and/or issue some commands to the movable imaging assembly via the wireless communications link to cause the movable imaging assembly to move and/or capture images. The beacon module 650 includes a display 660 for presenting status information for the movable imaging assembly. For example, the status information for the movable imaging assembly may include a battery remaining indicator, a video recording indicator, an encoding state (e.g., 4K video at 30 frames per second and a recording time), a flight mode (e.g., leash mode, mimic mode, or tripod mode), flight event notices, and/or user prompts. The beacon module 650 includes a record button 670 to start and stop the capture of images. The beacon module 650 includes a take-off/land button 672 to instruct an aerial vehicle (e.g., the aerial vehicle 500) to take-off or land, depending on the current flight state. The beacon module 650 includes a "pause follow" button 674 to pause and resume a follow function (e.g., by entering or leaving a tripod follow mode where the movable platform maintains its current position, but may still track motions of a subject by panning with a mechanical stabilization system). The beacon module 650 includes buttons 680 for 3-D repositioning of the movable imaging assembly relative to the subject bearing the beacon module 650. The beacon module 650 may also include a microphone for receiving voice commands (e.g., "follow-me," "pause," and "record").

FIG. 7A is a block diagram of an example of a system 700 configured for image capture. The system 700 includes an image capture device 710 (e.g., the movable imaging assembly 160 or the movable imaging assembly 162) that includes a processing apparatus 712 that is configured to receive images from one or more image sensors 714. The image capture device 710 includes gimbals and motors 716 that are actuators of a mechanical stabilization system configured to control an orientation of the one or more image sensors 714 (e.g., an orientation with respect to a movable platform). The gimbals and motors 716 may be controlled by a controller of the mechanical stabilization system, which may be implemented by the processing apparatus 712 (e.g., as a software module or a specialized hardware module). The processing apparatus 712 may be configured to perform image signal processing (e.g., filtering, tone mapping, stitching, electronic image stabilization, and/or encoding) to generate output images based on image data from the one or more image sensors 714. The image capture device 710 includes one or more motion sensors 718 configured to detect motion of the one or more image sensors 714. The one or more motion sensors 718 may provide feedback signals to the mechanical stabilization system. The image capture device 710 includes a communications interface 722 for transferring images to other devices and/or receiving commands or other control signaling. The image capture device 710 includes a user interface 720, which may allow a user to control image capture functions and/or view images. The image capture device 710 includes a battery 724 for powering the image capture device 710. For example, the system 700 may be used to implement processes described in this disclosure, such as the process 900 of FIG. 9, the process 1000 of FIG. 10, and the process 1100 of FIG. 11.

The processing apparatus 712 may include one or more processors having single or multiple processing cores. The processing apparatus 712 may include memory, such as random access memory device (RAM), flash memory, or any other suitable type of storage device such as a non-transitory computer readable memory. The memory of the processing apparatus 712 may include executable instructions and data that can be accessed by one or more processors of the processing apparatus 712. For example, the processing apparatus 712 may include one or more DRAM modules such as double data rate synchronous dynamic random-access memory (DDR SDRAM). In some implementations, the processing apparatus 712 may include a digital signal processor (DSP). In some implementations, the processing apparatus 712 may include an application specific integrated circuit (ASIC). For example, the processing apparatus 712 may include a custom image signal processor. In some implementations, the processing apparatus 712 may have multiple processing units in different portions the image capture device 710. For example, the processing apparatus 712 may include a processor on a movable platform (e.g., the aerial vehicle 120, the handheld module 130, the handheld module 300, or the aerial vehicle 500) and a processor in an image capture module (e.g., the image capture module 110 or the image capture module 200) that are removably attached by a connector.

The one or more image sensors 714 are configured to capture images. The one or more image sensors 714 are configured to detect light of a certain spectrum (e.g., the visible spectrum or the infrared spectrum) and convey information constituting an image as electrical signals (e.g., analog or digital signals). For example, the one or more image sensors 714 may include charge-coupled devices (CCD) or active pixel sensors in complementary metal-oxide-semiconductor (CMOS). The one or more image sensors 714 may detect light incident through respective lens (e.g., a rectilinear lens or a fisheye lens). In some implementations, the one or more image sensors 714 include analog-to-digital converters. In some implementations, the one or more image sensors 714 have respective fields of view that overlap.

The mechanical stabilization system for the one or more image sensors 714 includes the gimbals and motors 716. The gimbals and motors 716 may be parts of a mechanical stabilization system (e.g., the mechanical stabilization system 220). The gimbals and motors 716 may attach the one or more image sensors 714 to a movable platform (e.g., the aerial vehicle 120 or the handheld module 130) via a connector (e.g., the connector 230) and control their orientation. The gimbals and motors 716 may span multiple axes (e.g., a 7-axis gimbal set with brushless direct current motors). The mechanical stabilization system may include a controller (e.g., a proportional integral derivative (PID) controller). For example, the controller of the mechanical stabilization system may be implemented by the processing apparatus 712 (e.g., as a software module or a specialized hardware module).

The one or more motion sensors 718 are configured to detect motion of the one or more image sensors 714. For example, the one or more motion sensors 718 may include parts of an inertial measurement unit (e.g., including gyroscopes, accelerometers, and/or magnetometers) that is mounted in a housing with the one or more image sensors 714. In some implementations, the one or more motion sensors 718 may include parts of an inertial measurement unit that is mounted in a movable platform (e.g., the aerial vehicle 120 or the handheld module 130) of the image capture device 710. In some implementations, the one or more motion sensors 718 includes sensors (e.g., magnetic encoders, optical encoders, and/or potentiometers) that detect the state of the gimbals and motors 716 to measure a relative orientation of the image sensor and a movable platform of the image capture device 710. For example, the one or more motion sensors 718 may include encoders configured to detect a position and orientation of the image sensor relative to a movable platform (e.g., the aerial vehicle 120 or the handheld module 130). The processing apparatus 712 may be configured to determine a sequence of orientation estimates based on sensor data from the one or more motion sensors 718. For example, determining the sequence of orientation estimates may include applying quadratic estimation to sensor data from a plurality of the one or more motion sensors 718.

The image capture device 710 may include a user interface 720. For example, the user interface 720 may include an LCD display for presenting images and/or messages to a user. For example, the user interface 720 may include a touch-screen display for interactively displaying images and other data and receiving user commands. For example, the user interface 720 may include a microphone for receiving voice commands from a user. For example, the user interface 720 may include a button or switch enabling a person to manually turn the image capture device 710 on and off. For example, the user interface 720 may include a shutter button for snapping pictures.

The image capture device 710 may include a communications interface 722, which may enable communications with a personal computing device (e.g., a smartphone, a tablet, a laptop computer, or a desktop computer) and one or more specialized controllers (e.g., the controller module 140 and/or the beacon module 150). For example, the communications interface 722 may be used to receive commands controlling image capture and processing in the image capture device 710. For example, the communications interface 722 may be used to transfer image data to a personal computing device or a specialized controller controllers (e.g., the controller module 140). For example, the communications interface 722 may include a wired interface, such as a high-definition multimedia interface (HDMI), a universal serial bus (USB) interface, or a FireWire interface. For example, the communications interface 722 may include a wireless interface, such as a Bluetooth interface, a ZigBee interface, and/or a Wi-Fi interface.

The image capture device 710 may include a battery 724 that powers the image capture device 710 and/or its peripherals. For example, the battery 724 may be a detachable flight battery for an aerial vehicle. For example, the battery 724 may be a part of a handheld module. For example, the battery 724 may be charged wirelessly or through a micro-USB interface.

FIG. 7B is a block diagram of an example of a system 730 configured for image capture. The system 730 includes an image capture device 740 (e.g., the movable imaging assembly 160 or the movable imaging assembly 162) and a personal computing device 760 that communicate via a communications link 750. The image capture device 740 includes one or more image sensors 742 that are configured to capture images. The image capture device 740 includes a communications interface 748 configured to transfer images via the communication link 750 to the personal computing device 760. The personal computing device 760 includes a processing apparatus 762 that is configured to receive, using the communications interface 766, images from the one or more image sensors 742. The image capture device 740 includes gimbals and motors 744 that are actuators of a mechanical stabilization system configured to control an orientation of the one or more image sensors 742 (e.g., an orientation with respect to a movable platform). The gimbals and motors 744 may be controlled by a controller of the mechanical stabilization system, which may be implemented by the processing apparatus 762 (e.g., as a software module or a specialized hardware module) and provide control signals to the motors 744 via the communication link 750. The processing apparatus 762 may be configured to perform image signal processing (e.g., filtering, tone mapping, stitching, electronic image stabilization, and/or encoding) to generate output images based on image data from the one or more image sensors 742. The image capture device 740 includes one or more motion sensors 746 configured to detect motion of the one or more image sensors 742. The one or more motion sensors 746 may provide feedback signals (e.g., via communication link 750 or internally within the image capture device 740) to the mechanical stabilization system. For example, the system 730 may be used to implement processes described in this disclosure, such as the process 900 of FIG. 9, the process 1000 of FIG. 10, and the process 1100 of FIG. 11.

The one or more image sensors 742 are configured to capture images. The one or more image sensors 742 are configured to detect light of a certain spectrum (e.g., the visible spectrum or the infrared spectrum) and convey information constituting an image as electrical signals (e.g., analog or digital signals). For example, the one or more image sensors 742 may include charge-coupled devices (CCD) or active pixel sensors in complementary metal-oxide-semiconductor (CMOS). The one or more image sensors 742 may detect light incident through respective lens (e.g., a rectilinear lens or a fisheye lens). In some implementations, the one or more image sensors 742 include analog-to-digital converters. In some implementations, the one or more image sensors 742 have respective fields of view that overlap.

The processing apparatus 762 may include one or more processors having single or multiple processing cores. The processing apparatus 762 may include memory, such as random access memory device (RAM), flash memory, or any other suitable type of storage device such as a non-transitory computer readable memory. The memory of the processing apparatus 762 may include executable instructions and data that can be accessed by one or more processors of the processing apparatus 762. For example, the processing apparatus 762 may include one or more DRAM modules such as double data rate synchronous dynamic random-access memory (DDR SDRAM). In some implementations, the processing apparatus 762 may include a digital signal processor (DSP). In some implementations, the processing apparatus 762 may include an application specific integrated circuit (ASIC). For example, the processing apparatus 762 may include a custom image signal processor.

The mechanical stabilization system for the one or more image sensors 742 includes the gimbals and motors 744. The gimbals and motors 744 may be parts of a mechanical stabilization system (e.g., the mechanical stabilization system 220). The gimbals and motors 744 may connect the one or more image sensors 742 to a movable platform and control their orientation. The gimbals and motors 744 may span multiple axes (e.g., a 7-axis gimbal set with brushless direct current motors). The mechanical stabilization system may include a controller (e.g., a proportional integral derivative (PID) controller). For example, the controller of the mechanical stabilization system may be implemented by the processing apparatus 762 (e.g., as a software module or a specialized hardware module). For example, the controller of the mechanical stabilization system may be implemented by a specialized hardware module integrated with the image capture device 740.

The one or more motion sensors 746 are configured to detect motion of the one or more image sensors 742. For example, the one or more motion sensors 746 may include parts of an inertial measurement unit (e.g., including gyroscopes, accelerometers, and/or magnetometers) that is mounted in a housing with the one or more image sensors 742. In some implementations, the one or more motion sensors 746 may include parts of an inertial measurement unit that is mounted in a movable platform (e.g., the aerial vehicle 120 or the handheld module 130) of the image capture device 740. In some implementations, the one or more motion sensors 746 include sensors (e.g., magnetic encoders, optical encoders, and/or potentiometers) that detect the state of the gimbals and motors 744 to measure a relative orientation of the image sensor and a movable platform of the image capture device 740. For example, the one or more motion sensors 746 may include encoders configured to detect a position and orientation of the image sensor relative to a movable platform (e.g., the aerial vehicle 120 or the handheld module 130). The processing apparatus 762 may be configured to determine a sequence of orientation estimates based on sensor data from the one or more motion sensors 746. For example, determining the sequence of orientation estimates may include applying quadratic estimation to sensor data from a plurality of the one or more motion sensors 746.

The communications link 750 may be a wired communications link or a wireless communications link. The communications interface 748 and the communications interface 766 may enable communications over the communications link 750. For example, the communications interface 748 and the communications interface 766 may include a high-definition multimedia interface (HDMI), a universal serial bus (USB) interface, a FireWire interface, a Bluetooth interface, a ZigBee interface, and/or a Wi-Fi interface. For example, the communications interface 748 and the communications interface 766 may be used to transfer image data from the image capture device 740 to the personal computing device 760 for image signal processing (e.g., filtering, tone mapping, stitching, and/or encoding) to generate output images based on image data from the one or more image sensors 742. For example, the communications interface 748 and the communications interface 766 may be used to transfer motion sensor data from the image capture device 740 to the personal computing device 760 for processing in a controller of a mechanical stabilization system. For example, the communications interface 748 and the communications interface 766 may be used to transfer control signals to the image capture device 740 from the personal computing device 760 for controlling the gimbals and motors 744 of a mechanical stabilization system and/or motion of an aerial vehicle of the image capture device 740.

The personal computing device 760 may include a user interface 764. For example, the user interface 764 may include a touchscreen display for presenting images and/or messages to a user and receiving commands from a user. For example, the user interface 764 may include a button or switch enabling a person to manually turn the personal computing device 760 on and off. In some implementations, commands (e.g., start recording video, stop recording video, snap photograph, or select tracking target) received via the user interface 764 may be passed on to the image capture device 740 via the communications link 750.

Figure 8:
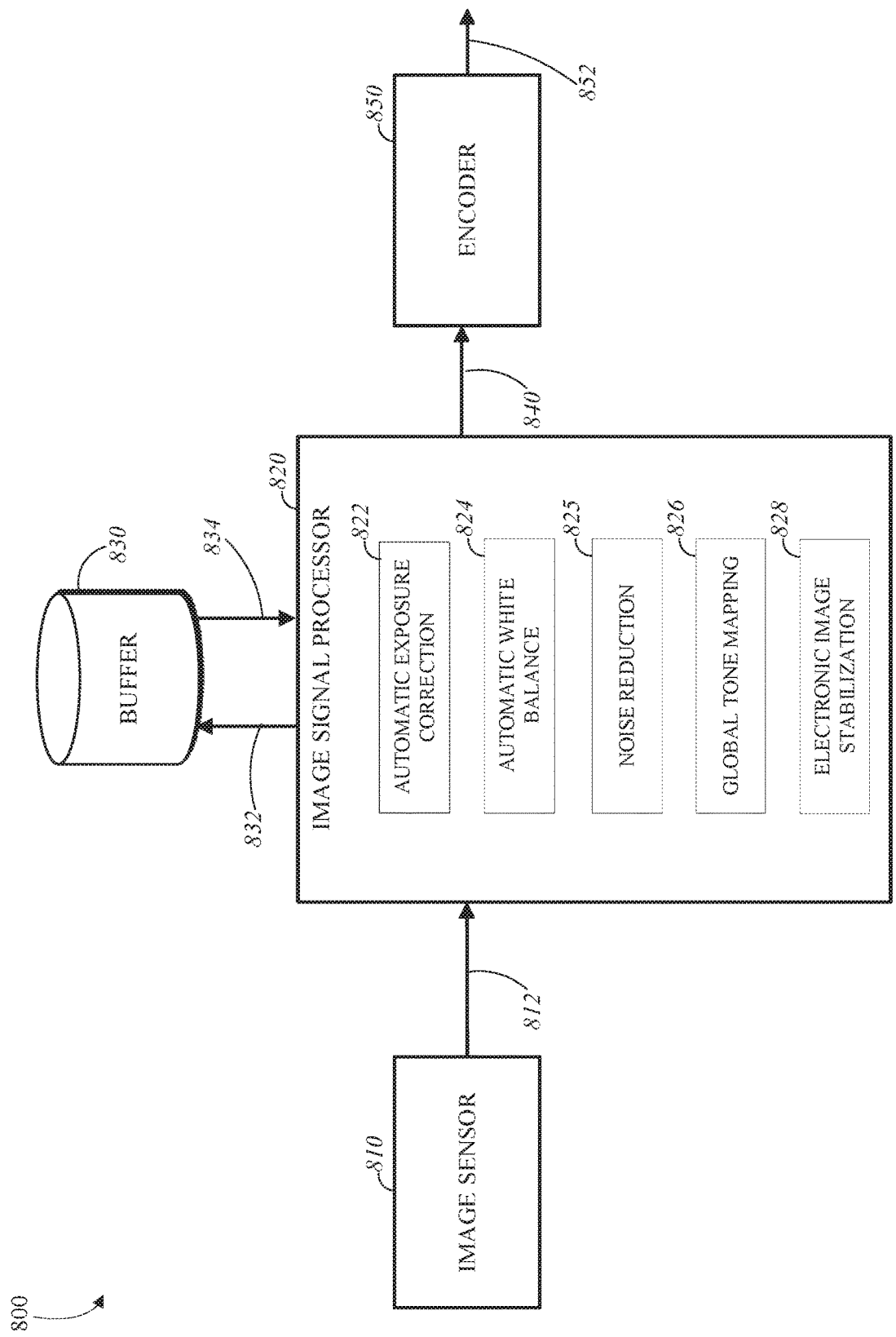
FIG. 8 is a block diagram of an example of an image capture system.

FIG. 8 is a block diagram of an example of an image capture system 800. The image capture system 800 includes an image sensor 810 configured to capture a sequence of images; an image signal processor 820 configured to apply image processing to the sequence of images; a buffer 830 configured to store the sequence of images; and an encoder 850 configured to encode the sequence of images as a compressed bitstream. Storing the sequence of images (e.g., frames of video) in the buffer 830 may provide processing delay to enable non-causal, look-ahead filtering to determine a smoother sequence of parameters for image processing performed by the image signal processor 820, which may improve quality of the resulting processed images 840. For example, the image capture system 800 may be used to implement processes described in this disclosure, such as the process 900 of FIG. 9. For example, the image capture system 800 may be included in the movable imaging system 100 of FIG. 1 (e.g., within the image capture module 110 or distributed between multiple components of the movable imaging system 100). For example, the image capture system 800 may be included in the image capture device 710 of FIG. 7A or distributed between image capture device 740 and the personal computing device 760 of FIG. 7B.

The image capture system 800 includes an image sensor 810 configured to capture a sequence of images 812 (e.g., frames of video). The image sensor 810 may be configured to detect light of a certain spectrum (e.g., the visible spectrum or the infrared spectrum) and convey information constituting an image as electrical signals (e.g., analog or digital signals). For example, the image sensor 810 may include charge-coupled devices (CCD) or active pixel sensors in complementary metal-oxide-semiconductor (CMOS). The image sensor 810 may detect light from the environment that is incident through a lens. For example, image sensor 810 may be the image sensor 210. For example, image sensor 810 may be one of the one or more image sensors 714 of FIG. 7A. For example, image sensor 810 may be one of the one or more image sensors 742 of FIG. 7B. The image sensor 810 may be configured to capture the sequence of images and pass the sequence of images 812 to the image signal processor 820.

The image capture system 800 includes an image signal processor 820 configured to determine a sequence of parameters for respective images in the sequence of images 812 based on the respective images, apply a non-causal filter to the sequence of parameters to obtain a temporally smoothed parameter for a current image 834 in the sequence of images, and apply image processing to the current image 834 based on the temporally smoothed parameter to obtain a processed image 840. The image signal processor 820 includes a number of modules that implement various types of image processing operations on images in the sequence of images 812. In this example, the image signal processor includes an automatic exposure correction module 822, an automatic white balance module 824, a noise reduction module 825 (e.g., implementing temporal and/or spatial noise reduction processing), a global tone mapping module 826, and an electronic image stabilization module 828. These modules (822, 824, 825, 826, and 828) can be configured to perform image processing on a current image 834 using the temporally smoothed parameter, which may include an automatic exposure gain, a tuple of automatic white balance gains, a noise reduced pixel value, a tuple of global tone mapping gains, and/or a rotation for electronic image stabilization). Other types of image processing operations may be performed by the image signal processor 820, such as noise reduction processing, local tone mapping, stitching and blending of images from multiple image sensors, and/or lens distortion correction.

The image signal processor 820 may access a newly captured image 832 in the sequence of images 812 from the image sensor 810 and determine a parameter in the sequence of parameters based on the newly captured image 832, before storing the newly captured image 832 in the buffer 830. The image signal processor 820 analyzes the sequence of parameters to determine a temporally smoothed parameter based on the sequence of parameters. For example, sequence of parameters may be averaged over a window of capture times for corresponding images. For example, the process 1000 of FIG. 10 may be implemented to determine a temporally smoothed parameter based on the sequence of parameters. A current image 834 (e.g., an oldest image in the buffer 830) may be retrieved from the buffer for image processing using the temporally smoother parameter. The result of the image processing using the temporally smoothed parameter may be a processed image 840

The image capture system 800 includes a buffer 830 configured to store the sequence of images (e.g., frames of video). For example, the buffer 830 may be a circular buffer that stores the most recent images that have been captured in a sequence over a fixed period of time (e.g., a buffer of the last 0.5, 1, or 2 seconds of video frames). For example, a new image 832 may be written over an oldest image stored in the buffer 830 after that oldest image has been processed by the image signal processor 820. A current image 834 (e.g., an oldest image stored in the buffer 830) may retrieved from the buffer 830 and for image processing using one or more temporally smoothed parameters that have been determined based on a sequence of parameters including parameters corresponding to images stored in the buffer 830 that were captured after the current image 834. In some implementations, the sequence of parameters is also stored in the buffer 830. For example, the buffer 830 may be implemented in memory of a processing apparatus (e.g., the processing apparatus 712 of the processing apparatus 762.

The image capture system 800 includes an encoder 850 configured to encode a sequence of processed images 840 as a compressed bitstream 852. The encoder 850 may encode or compress a sequence of processed images 840 of the image signal processor 820. In some implementations, the encoder 850 may implement the one or more encoding standards (e.g., MPEG or VP9). The encoder 850 may output encoded video as a compressed bitstream 852. For example, the compressed bitstream 852 may include one or more output images based on a corresponding processed image 840.

The image capture system 800 may be implemented as part of the movable imaging system 100 of FIG. 1. The larger system may include an image capture module (e.g., the image capture module 110) that includes the image sensor 810, a connector (e.g., the connector 230), and an integrated mechanical stabilization system (e.g., the mechanical stabilization system 220) configured to control an orientation of the image sensor 810 relative to the connector. The larger system may include an aerial vehicle (e.g., the aerial vehicle 120) configured to be removably attached to the image capture module 110 by the connector and to fly while carrying the image capture module 110. The larger system may include a handheld module (e.g., the handheld module 130) configured to be removably attached to the image capture module 110 by the connector. The handheld module 130 may include a battery and a display configured to display images received from the image sensor 810 via conductors of the connector. In some implementations, the image signal processor 820 is part of a processing apparatus (e.g. the processing apparatus 712) that is inside the image capture module. In some implementations, the image signal processor 820 is part of a processing apparatus (e.g. the processing apparatus 762) that is outside the image capture module.

Figure 9:
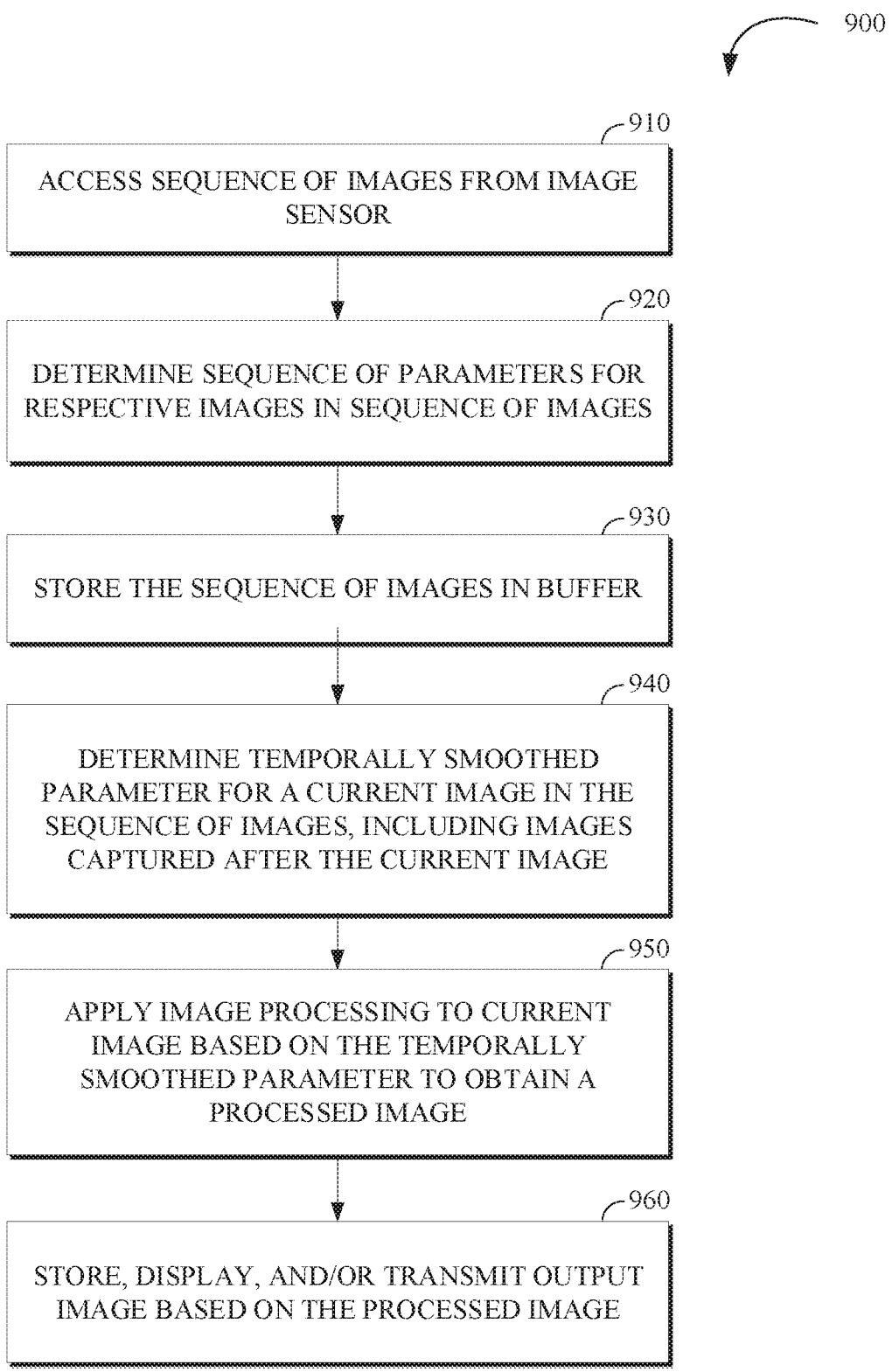
FIG. 9 is a flowchart of an example of a process for image capture with temporal smoothing of image processing parameters.

FIG. 9 is a flowchart of an example of a process 900 for image capture with temporal smoothing of image processing parameters. The process 900 includes accessing 910 a sequence of images from an image sensor; determining 920 a sequence of parameters for respective images in the sequence of images based on the respective images; storing 930 the sequence of images in a buffer; determining 940 a temporally smoothed parameter for a current image in the sequence of images based on the sequence of parameters, wherein the sequence of parameters includes parameters for images in the sequence of images that were captured after the current image; applying 950 image processing to the current image based on the temporally smoothed parameter to obtain a processed image; and storing, displaying, or transmitting 960 an output image based on the processed image. For example, the process 900 may be implemented by the system 700 of FIG. 7A or the system 730 of FIG. 7B. For example, the process 900 may be implemented by an image capture device, such the image capture device 710 shown in FIG. 7A. For example, the process 900 may be implemented by a personal computing device, such as the personal computing device 760. For example, the process 900 may be implemented using a processing apparatus (e.g., the processing apparatus 712) that includes an image signal processor (e.g., the image signal processor 820). For example, the process 900 may be implemented by the image capture system 800 of FIG. 8. For example, the process 900 may be implemented by the movable imaging system 100 of FIG. 1.

The process 900 includes accessing 910 a sequence of images from an image sensor (e.g., the image sensor 810 of FIG. 8, the one or more image sensors 714 of FIG. 7A, the one or more image sensors 742 of FIG. 7B, or the image sensor 210 of FIG. 2A). The image sensor may be part of an image capture system (e.g., the movable imaging system 100). In some implementations, the image sensor may be attached to a processing apparatus that implements the process 900. For example, the sequence of images may be accessed 910 from the image sensor via a bus. In some implementations, the sequence of images may be accessed 910 via a communications link (e.g., the communications link 750). For example, the sequence of images may be accessed 910 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the sequence of images may be accessed 910 via communications interface 366. For example, the sequence of images may be accessed 910 as an input image signal, which may represent each pixel value in a defined format, such as in a RAW image format. In some implementations, the sequence of images may be frames of video. In some implementations, the sequence of images is accessed 910 directly from the image sensor without intermediate image processing. In some implementations, the sequence of images is accessed 910 after being subjected to intermediate image processing (e.g., correction of dead pixels, band processing, decoupling of vertical blanking, spatial noise reduction, and/or temporal noise reduction).

The process 900 includes determining 920 a sequence of parameters for respective images in the sequence of images based on the respective images. For example, a parameter in the sequence of parameters may include a statistic of pixel value of a respective image. A parameter in the sequence of parameters may include an automatic exposure gain for a respective image. For example, automatic exposure gains may be determined 920 for a respective image in the sequence of images by an automatic exposure correction module (e.g., the automatic exposure correction module 822). A parameter in the sequence of parameters may include a tuple of automatic white balance gains for a respective image. For example, a tuple of automatic white balance gains may be determined 920 for a respective image in the sequence of images by an automatic white balance module (e.g., the automatic white balance module 824). A parameter in the sequence of parameters may include a set of pixel values for a respective image. For example, a set of noise reduced pixel values may be determined 920 for a respective image in the sequence of images by a noise reduction module (e.g., the noise reduction module 825). A parameter in the sequence of parameters may include a tuple of global tone mapping gains or output values for a respective image. For example, a tuple of global tone mapping gains or output values may be determined 920 for a respective image in the sequence of images by a global tone mapping module (e.g., the global tone mapping module 826). A parameter in the sequence of parameters may include a rotation for a respective image. For example, a rotation may be determined 920 for a respective image in the sequence of images by an electronic image stabilization module (e.g., the electronic image stabilization module 828).

The process 900 includes storing 930 the sequence of images in a buffer (e.g., the buffer 830). The buffer may provide processing delay to enable non-causal, look-ahead filtering to determine a smoother sequence of image processing parameters for the sequence of images (e.g., automatic white balance gains, global tone mapping gains, or rotations for correction by an electronic image stabilization module). For example, the buffer may be a circular buffer that stores the most recent images that have been captured in the sequence of images over a fixed period of time (e.g., a buffer of the last 0.5, 1, or 2 seconds of video frames). For example, when a new image is captured, the new image may be written over an oldest image stored in the buffer after that oldest image has been processed and output for encoding by an image signal processor (e.g., the image signal processor 820. In some implementations, the sequence of parameters determined 920 may be stored 930 in the buffer with their respective images in the sequence of images. For example, a parameter in the sequence of parameters corresponding to a respective image in the sequence of images may be stored 930 as metadata in a header data structure for the respective image as it is stored in the buffer. For example, the buffer may be a data structure in memory of a processing apparatus (e.g., the processing apparatus 712 of FIG. 7A or the processing apparatus 762 of FIG. 7B).

The process 900 includes determining 940 a temporally smoothed parameter for a current image in the sequence of images based on the sequence of parameters. The sequence of parameters includes parameters for images in the sequence of images that were captured after the current image. In some implementations, determining 940 the temporally smoothed parameter includes applying a filter to the sequence of parameters to obtain the temporally smoothed parameter. For example, the temporally smoothed parameter may be an automatic exposure gain that is applied by an image signal processor (e.g., the image signal processor 820) to all color channels of the current image. For example, the temporally smoothed parameter may be a tuple of automatic white balance gains that are applied to respective color channels of the current image. In some implementations, the tuple of automatic white balance gains includes a red channel gain that is applied to a red channel of the current image and a blue channel gain that is applied to a blue channel of the current image. For example, the temporally smoothed parameter may be a tuple of global tone mapping gains or output values for respective ranges of input pixel values. In some implementations, determining 940 the temporally smoothed parameter includes determining an average of the sequence of parameters over a window of time. For example, the process 1000 of FIG. 10 may be implemented to determine 940 the temporally smoothed parameter. In some implementations, determining 940 the temporally smoothed parameter includes applying a bilateral filter to the sequence of parameters. In some implementations, determining 940 the temporally smoothed parameter includes applying a bilateral filter followed by a shorter term average filter to the sequence of parameters, so as to have an average over a long period when parameters are pretty stable and an average over a short period when parameters are changing rapidly. For example, parameters may be considered to change rapidly when changes over time are greater than a threshold value associated with the bilateral filter, such as a standard deviation of a range kernel for smoothing differences (e.g., a Gaussian function).

The process 900 includes applying 950 image processing to the current image based on the temporally smoothed parameter to obtain a processed image. For example, the temporally smoothed parameter may be an automatic exposure gain that may be applied 950 to the current image by an automatic exposure correction module (e.g., the automatic exposure correction module 822). For example, the temporally smoothed parameter may be a tuple of automatic white balance gains (e.g., a red channel gain and a blue channel gain) that may be applied 950 to the current image by an automatic white balance module (e.g., the automatic white balance module 824). For example, the temporally smoothed parameter may be a set of noise reduced pixel values (e.g., pixel values of a current frame may be determined by a weighted average of corresponding pixel values from the current frame, three previous frames, and three later frames that are stored in the buffer) that may be applied 950 to the current image by a noise reduction module (e.g., the noise reduction module 825). Noise reduction processing using future frames stored in the buffer may reduce pixel noise levels, hence the quality of the output, by increasing the number of used frames while not increasing the temporal distance between the furthest frame and the current frame, which in turns means that we do not increase the ghosting artifacts due to the scene evolution between the current frame and the used frames. For example, the temporally smoothed parameter may be a tuple of global tone mapping gains or output values (e.g., a tuple specifying the transfer function 1255 of FIG. 12) that may be applied 950 to the current image by a global tone mapping module (e.g., the global tone mapping module 826). For example, the temporally smoothed parameter may be a rotation that may be applied 950 to the current image by an electronic image stabilization module (e.g., the electronic image stabilization module 828). For example, the process 1100 of FIG. 11 may be implemented to determine 940 and apply 950 temporally smoothed rotation for electronic image stabilization. Multiple temporally smoothed parameters may be determined 940 and applied 950 to the current image to leverage the buffering of the sequence of images to improve image quality by reducing certain artifacts from abrupt changes that occur during the capture of the sequence of images.

The process 900 includes storing, displaying, or transmitting 960 an output image based on the processed image. In some implementations, the output image is the processed image. In some implementations, the processed image may by subject to additional image processing (e.g., noise reduction processing, local tone mapping, lens distortion correction, electronic rolling shutter correction, stitching with parallax correction and blending to combine images from multiple image sensors, and/or output projection) to determine the output image. For example, the output image may be transmitted 960 to an external device (e.g., a personal computing device) for display or storage. For example, the output image may be stored 960 in memory of a processing apparatus (e.g., the processing apparatus 712 or the processing apparatus 762). For example, the output image may be displayed 960 in the user interface 720 or in the user interface 764. For example, the output image may be displayed 960 on the display 310. For example, the output image may be transmitted 960 via the communications interface 722. For example, the output image may be transmitted 960 to the controller module 600 or the personal computing device 420.

Figure 10:
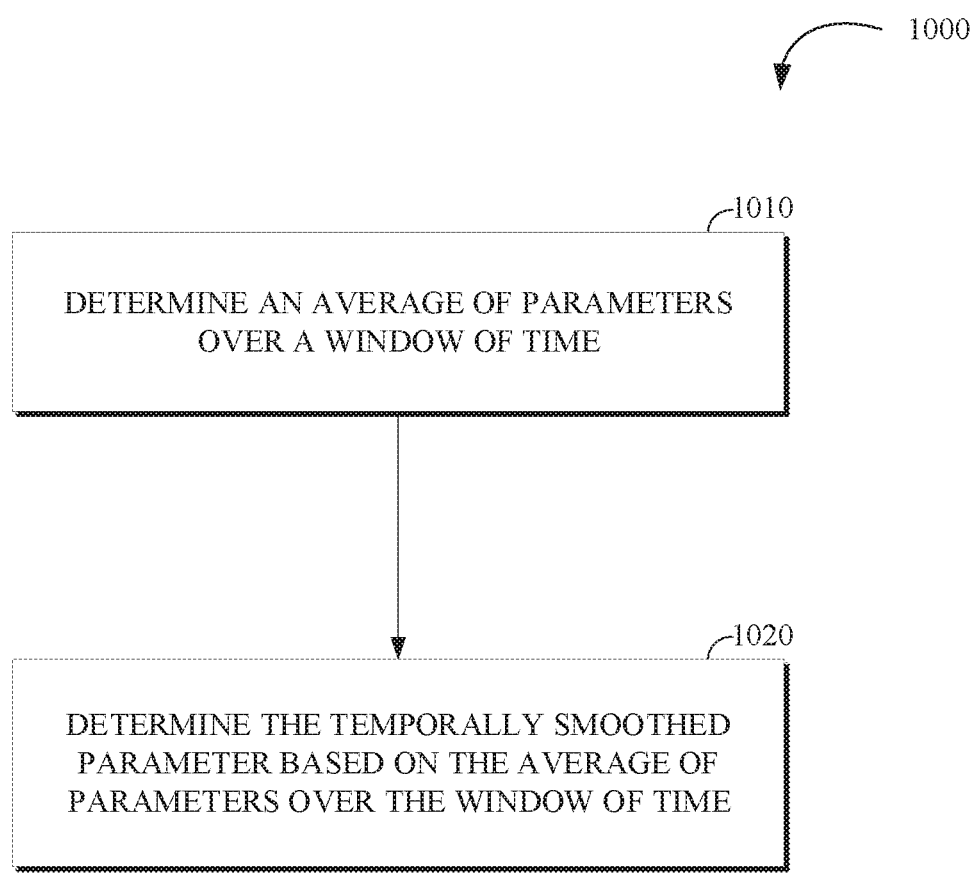
FIG. 10 is a flowchart of an example of a process for determining a temporally smoothed parameter for a current image in a sequence of buffered images.

FIG. 10 is a flowchart of an example of a process 1000 for determining a temporally smoothed parameter for a current image in a sequence of buffered images. The process 1000 includes determining 1010 an average of parameters over a window of time that includes the sequence of parameters; and determining 1020 the temporally smoothed parameter based on the average of parameters over the window of time. For example, the process 1000 may be implemented by the system 700 of FIG. 7A or the system 730 of FIG. 7B. For example, the process 1000 may be implemented by an image capture device, such the image capture device 710 shown in FIG. 7A. For example, the process 1000 may be implemented by a personal computing device, such as the personal computing device 760. For example, the process 1000 may be implemented using a processing apparatus (e.g., the processing apparatus 712) that includes an image signal processor (e.g., the image signal processor 820). For example, the process 1000 may be implemented by the image capture system 800 of FIG. 8. For example, the process 1000 may be implemented by the movable imaging system 100 of FIG. 1.

The process 1000 includes determining 1010 an average of parameters over a window of time that includes the sequence of parameter. In some implementations, the window of time includes times when older images were captured, before the current image was captured, and the parameters for these older images are accessed for determining the average of parameters over the window of time after these older images have been deleted from the buffer (e.g., the buffer 830). For example, the window of time may include 1 second before the current image was captured and 1 second after the current image was captured. The time window of parameters that are averaged may be longer than the time window of images that are stored in the buffer at any given time. For example, a longer window of parameters, including older parameter values, may be maintained while saving memory by deleting corresponding older images from the buffer after they have been processed and output by an image signal processor (e.g., the image signal processor 820). In some implementations, the average of parameters over the window of time is a weighted average (e.g., with weights that depend on the times associated with the parameters in relation to the capture time of the current image). For example, the average of parameters over the window of time may be a weighted average that is determined using a Gaussian weighting function.

The process 1000 includes determining 1020 the temporally smoothed parameter based on the average of parameters over the window of time. For example, the temporally smoothed parameter may be determined 1020 as equal to the average of parameters over the window of time. In some implementations, the temporally smoothed parameter is determined 1020 as weighted average of the nominal parameter for the current image (i.e., the parameter that is determined based only on information of the current image) and the average of parameters over the window of time. The weights used to combine these two values may depend on other information, such as a user configuration setting or which movable platform (e.g., the aerial vehicle 120 or the handheld module 130) from among a set of alternative movable platforms an image capture module including the image sensor is currently attached to.

Figure 11:
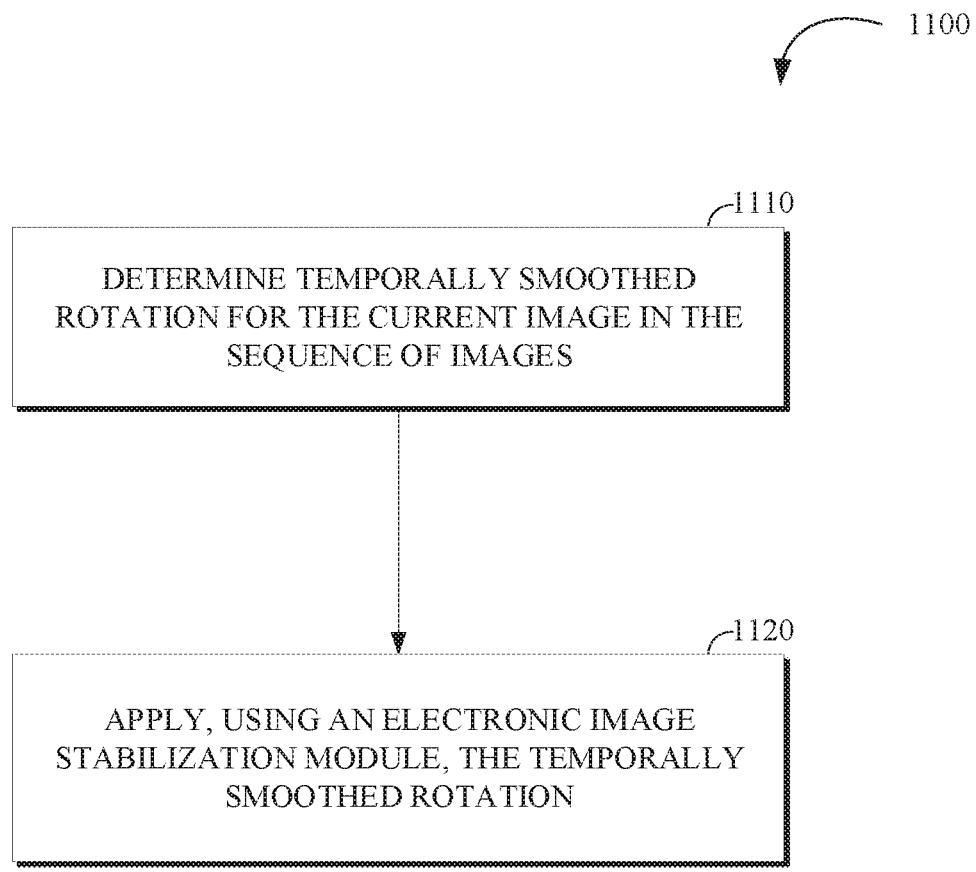
FIG. 11 is a flowchart of an example of a process for determining a temporally smoothed an electronic image stabilization rotation for a current image in a sequence of buffered images.

FIG. 11 is a flowchart of an example of a process 1100 for determining a temporally smoothed an electronic image stabilization rotation for a current image in a sequence of buffered images. The process 1100 may be used in conjunction with temporal smoothing of other image processing parameters (e.g., automatic exposure gain, automatic white balance gains, or global tone mapping gains) to better leverage a buffer of images and the associated algorithmic processing delay to improve image quality. The process 1100 includes determining 1110 a temporally smoothed rotation for the current image based on a sequence of rotations associated with respective images in a sequence of images, wherein the sequence of rotations includes rotations for images in the sequence of images that were captured after the current image; and applying 1120, using an electronic image stabilization module, the temporally smoothed rotation to the processed image. For example, the process 1100 may be implemented by the system 700 of FIG. 7A or the system 730 of FIG. 7B. For example, the process 1100 may be implemented by an image capture device, such the image capture device 710 shown in FIG. 7A. For example, the process 1100 may be implemented by a personal computing device, such as the personal computing device 760. For example, the process 1100 may be implemented using a processing apparatus (e.g., the processing apparatus 712) that includes an image signal processor (e.g., the image signal processor 820). For example, the process 1100 may be implemented by the image capture system 800 of FIG. 8. For example, the process 1100 may be implemented by the movable imaging system 100 of FIG. 1.

The process 1100 includes determining 1110 a temporally smoothed rotation for the current image in the sequence of images based on a sequence of rotations associated with respective images in the sequence of images. The sequence of rotations includes rotations for images in the sequence of images that were captured after the current image. This may facilitate enhanced smoothing of motion in a video signal by enabling an electronic image stabilization module to look-ahead to motion associated with images captured after the current image and start smoothly correcting for those motions in the current image, so that rotation corrections are less abrupt when the motion commences. In some implementations, the temporally smoothed rotation is determined 1110 as a weighted average of rotations for images captured in a window of time. The window of time may include times when older images were captured, before the current image was captured, and the rotations for these older images may be accessed for determining the average of rotations over the window of time after these older images have been deleted from the buffer (e.g., the buffer 830). The time window of rotations that are averaged may be longer than the time window of images that are stored in the buffer at any given time. For example, a longer window of rotations, including older rotations, may be maintained while saving memory by deleting corresponding older images from the buffer after they have been processed and output by an image signal processor (e.g., the image signal processor 820).

The process 1100 includes applying 1120, using an electronic image stabilization module, the temporally smoothed rotation to the processed image. The temporally smoothed rotation may be applied 1120 by invoking the electronic image stabilization module (e.g., the electronic image stabilization module 828) to correct the current image to obtain a stabilized image. For example, the electronic image stabilization module may be invoked by calling and/or executing a software implementation of the electronic image stabilization module and causing it to process input data, including the temporally smoothed rotation and the current image, to determine and apply a corrective rotation transformation to the current image from the image sensor to stabilize the current image (e.g., with respect to other images in a sequence of frames of video). For example, the electronic image stabilization module may be invoked by inputting data to a specialized hardware implementation of the electronic image stabilization module and causing it to process the input data to determine and apply a corrective rotation transformation to the current image from the image sensor to stabilize the current image.

Figure 12:
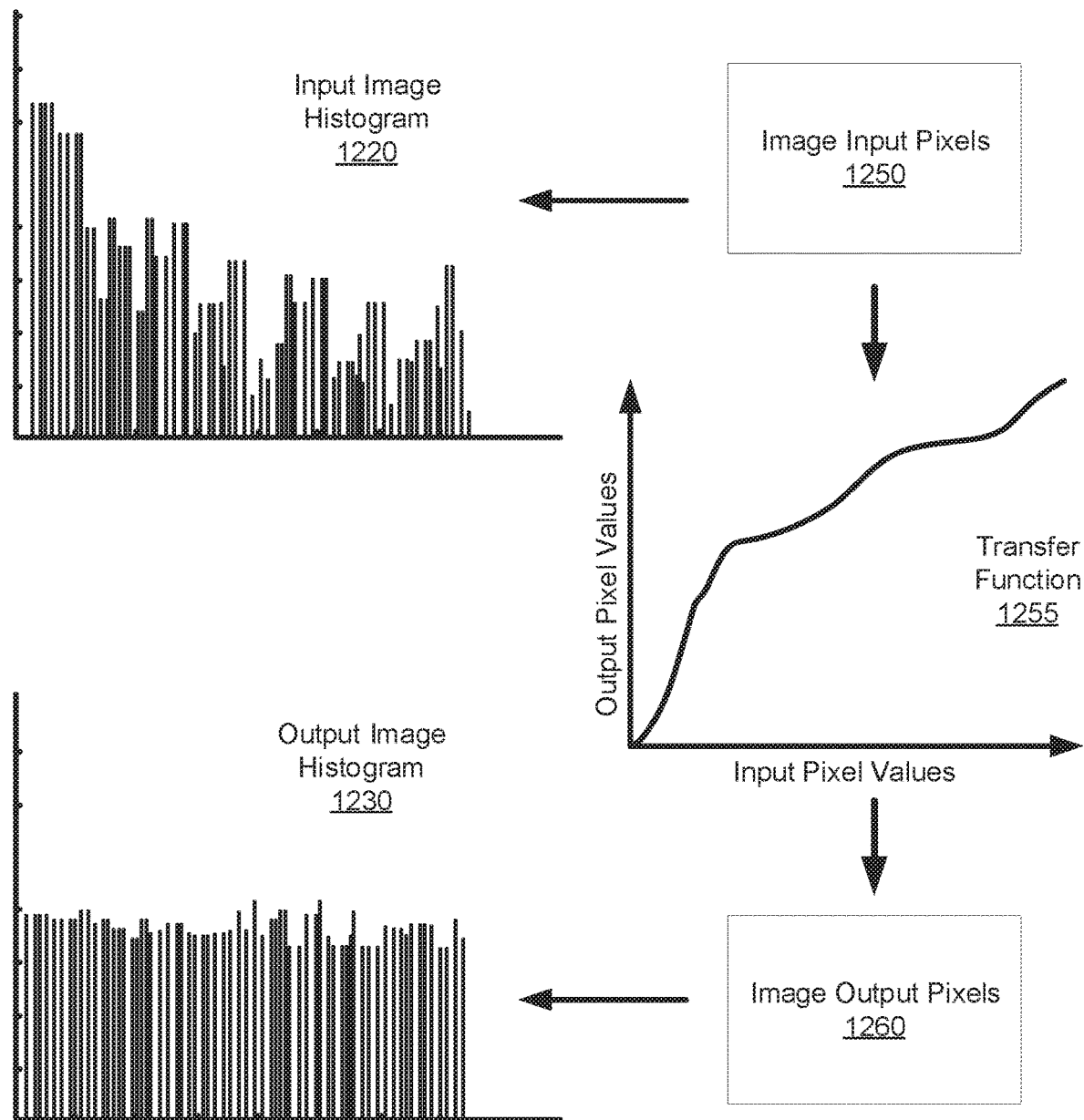
FIG. 12 illustrates an exemplary process of implementing a transfer function to convert input pixels to output pixels for global tone mapping of an image.

FIG. 12 illustrates an exemplary process of implementing a transfer function 1255 to convert input pixels 1250 to output pixels 1260 for global tone mapping of an image. The transfer function 1255 may be determined such that the output image histogram 1230 matches a target histogram that is a flat histogram. In some implementations, in order to convert the image such that it reaches the output image histogram 1230, a histogram transfer module determines a first cumulative distribution using the histogram 1220 of the input image. The cumulative distribution counts, at each intensity level, the number of pixels at that intensity level in the image along with the number of pixels with intensity levels below that intensity level. The first cumulative distribution, when applied to the pixels of the image, generates an image with a flat histogram. The histogram transfer module may also take the target histogram and generate a second cumulative function based on that target histogram. Note that the target histogram may be modified by the histogram transfer module to have the same area as the histogram 1220 of the original luminance image. The histogram transfer module then combines the first cumulative distribution with the inverse of the second cumulative distribution to generate the transfer function 1255. In some implementations, different methods are used to determine the transfer function between two histograms. Note that after applying the transfer function in FIG. 12, the output image histogram 1230 is not perfectly flat. This is due to the fact that the pixel counts and values are discrete and not continuous, and thus rounding and other quantization effects may affect the result.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system comprising:
an image sensor configured to capture a sequence of images; and
a processing apparatus configured to:
  access the sequence of images from the image sensor;
  determine a sequence of parameters for respective images in the sequence of images based on the respective images;
  store the sequence of images in a buffer;
  determine an average of parameters over a window of time that includes the sequence of parameters;
  determine a temporally smoothed parameter for a current image in the sequence of images based on the sequence of parameters, wherein the sequence of parameters includes parameters for images in the sequence of images that were captured after the current image, and wherein the temporally smoothed parameter is determined based on the average of parameters over the window of time, and wherein the window of time includes times when older images were captured, before the current image was captured, and the parameters for these older images are accessed for determining the average of parameters over the window of time after these older images have been deleted from the buffer; and
  apply image processing to the current image based on the temporally smoothed parameter to obtain a processed image.

2. The system of claim 1, in which the processing apparatus includes an image signal processor and the temporally smoothed parameter is an automatic exposure gain that is applied by the image signal processor to all color channels of the current image.

3. The system of claim 1, in which the temporally smoothed parameter is a tuple of automatic white balance gains that are applied to respective color channels of the current image.

4. The system of claim 3, in which the tuple of automatic white balance gains includes a red channel gain that is applied to a red channel of the current image and a blue channel gain that is applied to a blue channel of the current image.

5. The system of claim 1, in which the temporally smoothed parameter is a tuple of global tone mapping gains or output values for respective ranges of input pixel values.

6. The system of claim 1, in which the processing apparatus is configured to:
apply a filter to the sequence of parameters to obtain the temporally smoothed parameter.

7. The system of claim 1, in which the processing apparatus is configured to:
apply a bilateral filter followed by a shorter term average filter to the sequence of parameters to obtain the temporally smoothed parameter.

8. The system of claim 1, in which the average of parameters over the window of time is a weighted average that is determined using a Gaussian weighting function.

9. The system of claim 1, comprising:
an image capture module that includes the image sensor, a connector, and an integrated mechanical stabilization system configured to control an orientation of the image sensor relative to the connector.

10. The system of claim 9, comprising:
an aerial vehicle configured to be removably attached to the image capture module by the connector and to fly while carrying the image capture module; and
a handheld module configured to be removably attached to the image capture module by the connector, wherein the handheld module includes a battery and a display configured to display images received from the image sensor via conductors of the connector.

11. The system of claim 9, in which the processing apparatus is inside the image capture module.

12. The system of claim 1, in which the processing apparatus is configured to:
determine a temporally smoothed rotation for the current image in the sequence of images based on a sequence of rotations associated with respective images in the sequence of images, wherein the sequence of rotations includes rotations for images in the sequence of images that were captured after the current image; and
apply, using an electronic image stabilization module, the temporally smoothed rotation to the processed image.

13. The system of claim 1, in which the processing apparatus is configured to:
store the sequence of parameters in the buffer with their respective images in the sequence of images.

14. A method comprising:
accessing a sequence of images from an image sensor;
determining a sequence of parameters for respective images in the sequence of images based on the respective images;
storing the sequence of images in a buffer;
determining an average of parameters over a window of time that includes the sequence of parameters;
determining a temporally smoothed parameter for a current image in the sequence of images based on the sequence of parameters, wherein the sequence of parameters includes parameters for images in the sequence of images that were captured after the current image, and wherein the temporally smoothed parameter is determined based on the average of parameters over the window of time, and wherein the window of time includes times when older images were captured, before the current image was captured, and the parameters for these older images are accessed for determining the average of parameters over the window of time after these older images have been deleted from the buffer;
applying image processing to the current image based on the temporally smoothed parameter to obtain a processed image; and
storing, displaying, or transmitting an output image based on the processed image.

15. The method of claim 14, in which the temporally smoothed parameter is an automatic exposure gain that is applied by an image signal processor to all color channels of current image.

16. The method of claim 14, in which the temporally smoothed parameter is a tuple of automatic white balance gains that are applied to respective color channels of the current image.

17. The method of claim 14, in which the temporally smoothed parameter is a tuple of global tone mapping gains or output values for respective ranges of input pixel values.

18. The method of claim 14, comprising:
applying a bilateral filter followed by a shorter term average filter to the sequence of parameters to obtain the temporally smoothed parameter.

19. The method of claim 14, comprising:
determining a temporally smoothed rotation for the current image in the sequence of images based on a sequence of rotations associated with respective images in the sequence of images, wherein the sequence of rotations includes rotations for images in the sequence of images that were captured after the current image; and
applying, using an electronic image stabilization module, the temporally smoothed rotation to the processed image.

20. The method of claim 14, comprising:
storing the sequence of parameters in the buffer with their respective images in the sequence of images.

21. A system comprising:
an image sensor configured to capture a sequence of images;
a buffer configured to store the sequence of images;
an image signal processor configured to determine a sequence of parameters for respective images in the sequence of images based on the respective images, apply a non-causal filter to the sequence of parameters to obtain a temporally smoothed parameter for a current image in the sequence of images, and apply image processing to the current image based on the temporally smoothed parameter to obtain a processed image;
an image capture module that includes the image sensor, a connector, and an integrated mechanical stabilization system configured to control an orientation of the image sensor relative to the connector;
an aerial vehicle configured to be removably attached to the image capture module by the connector and to fly while carrying the image capture module; and
a handheld module configured to be removably attached to the image capture module by the connector, wherein the handheld module includes a battery and a display configured to display images received from the image sensor via conductors of the connector.

* * * * *